US012558936B2

(12) United States Patent
Hildebrand

(10) Patent No.: US 12,558,936 B2
(45) Date of Patent: Feb. 24, 2026

(54) HEATING ARRANGEMENT AND HEAT DISTRIBUTION UNIT FOR SUCH A HEATING ARRANGEMENT

(71) Applicant: Dometic Sweden AB, Solna (SE)

(72) Inventor: Henrik Hildebrand, Rheine (DE)

(73) Assignee: Dometic Sweden AB, Solna (SE)

( * ) Notice: Subject to any disclaimer, the term of this patent is extended or adjusted under 35 U.S.C. 154(b) by 983 days.

(21) Appl. No.: 17/579,442

(22) Filed: Jan. 19, 2022

(65) Prior Publication Data

US 2022/0227200 A1     Jul. 21, 2022

(30) Foreign Application Priority Data

Jan. 20, 2021     (DE) .......................... 102021200499.7

(51) Int. Cl.
B60H 1/00          (2006.01)

(52) U.S. Cl.
CPC ..... B60H 1/00364 (2013.01); B60H 1/00271 (2013.01); B60H 1/00328 (2013.01); B60H 1/00342 (2013.01)

(58) Field of Classification Search
None
See application file for complete search history.

(56) References Cited

U.S. PATENT DOCUMENTS

| 3,444,854 | A | 5/1969 | Fraim |
| D226,381 | S | 2/1973 | Harty, Jr. |

| 3,724,442 | A | 4/1973 | Gurney |
| 3,727,537 | A | 4/1973 | Harty, Jr. |
| 4,045,074 | A | 8/1977 | Howard |
| D284,025 | S | 5/1986 | Armstrong |
| 4,641,502 | A | 2/1987 | Aldrich et al. |
| 4,662,350 | A | 5/1987 | Mossbach |
| 4,672,818 | A | 6/1987 | Roth |

(Continued)

FOREIGN PATENT DOCUMENTS

| AU | 2004202967 A1 | 6/2005 |
| AU | 2007200788 A1 | 9/2007 |

(Continued)

OTHER PUBLICATIONS

KR101773015B1 machine translation. Espace.net (Year: 2024).*

(Continued)

*Primary Examiner* — Edelmira Bosques
*Assistant Examiner* — Deepak A Deean
(74) *Attorney, Agent, or Firm* — Dinsmore & Shohl LLP

(57)          ABSTRACT

A heating arrangement for recreational vehicles. The heating arrangement comprises a heating apparatus and a heat distribution unit. The heating apparatus comprises a heating unit configured to generate hot air. Furthermore, the heating apparatus comprises a first heat exchanging unit and a second heat exchanging unit. The first heat exchanging unit is configured for heat exchange between the hot air and a heating liquid in a heating liquid circuit. The second heat exchanging unit is configured for heat exchange between the hot air and ventilation air from an indoor room. The heat distribution unit comprises a third heat exchanging unit. The third heat exchanging unit is configured to be coupled to an external liquid supply line leading from a cold liquid supply to a hot liquid output device.

9 Claims, 12 Drawing Sheets

(56) References Cited

U.S. PATENT DOCUMENTS

| | | | |
|---|---|---|---|
| 4,709,623 A | 12/1987 | Roth et al. | |
| 4,710,610 A | 12/1987 | Reifel et al. | |
| D300,777 S | 4/1989 | Bales et al. | |
| D306,341 S | 2/1990 | Bales et al. | |
| 5,531,641 A | 7/1996 | Aldrich et al. | |
| D386,735 S | 11/1997 | Krueger et al. | |
| 5,727,998 A | 3/1998 | Krueger et al. | |
| 5,848,536 A | 12/1998 | Dodge et al. | |
| 5,899,081 A | 5/1999 | Evans et al. | |
| 5,960,157 A | 9/1999 | McGraw | |
| 6,116,095 A | 9/2000 | Radle | |
| 6,213,197 B1 | 4/2001 | Ebbeson | |
| 6,263,689 B1 | 7/2001 | Dodge et al. | |
| 6,449,973 B2 | 9/2002 | Dodge et al. | |
| 6,857,953 B2 | 2/2005 | Malott | |
| 7,020,386 B2 | 3/2006 | Scime et al. | |
| 7,036,332 B2 | 5/2006 | Hallin et al. | |
| 7,140,192 B2 | 11/2006 | Allen et al. | |
| 7,171,822 B2 | 2/2007 | Allen et al. | |
| 7,234,315 B2 | 6/2007 | Allen et al. | |
| 7,237,397 B2 | 7/2007 | Allen | |
| 7,316,119 B2 | 1/2008 | Allen | |
| 7,419,368 B2 | 9/2008 | Milks | |
| D588,479 S | 3/2009 | Giese | |
| 7,739,882 B2 | 6/2010 | Evans et al. | |
| 7,963,117 B2 | 6/2011 | Allen et al. | |
| 8,056,351 B2 | 11/2011 | Marciano et al. | |
| 8,056,933 B2 | 11/2011 | Liptak | |
| D661,386 S | 6/2012 | Bergin | |
| 8,240,168 B2 | 8/2012 | Holguin | |
| 8,535,127 B1 | 9/2013 | Malott | |
| 8,568,209 B2 | 10/2013 | Boxum | |
| D712,531 S | 9/2014 | Bergin | |
| D715,907 S | 10/2014 | Bergin | |
| D716,925 S | 11/2014 | Bergin | |
| D762,289 S | 7/2016 | Schmidt et al. | |
| D764,034 S | 8/2016 | Schmidt et al. | |
| D764,035 S | 8/2016 | Schmidt et al. | |
| 9,631,832 B2 | 4/2017 | Malott | |
| D785,771 S | 5/2017 | Bergin | |
| D785,772 S | 5/2017 | Bergin | |
| 9,651,284 B2 | 5/2017 | Esch | |
| D795,712 S | 8/2017 | Bergin et al. | |
| D811,566 S | 2/2018 | Liu et al. | |
| D817,466 S | 5/2018 | Moseley | |
| 9,975,405 B2 | 5/2018 | Siddiqui et al. | |
| D824,499 S | 7/2018 | Williamson et al. | |
| 10,082,345 B1 | 9/2018 | Mihail | |
| 10,093,152 B2 | 10/2018 | Allard et al. | |
| 10,107,520 B2 | 10/2018 | Schmidt et al. | |
| D834,961 S | 12/2018 | Bergin et al. | |
| D841,138 S | 2/2019 | Williamson et al. | |
| D850,609 S | 6/2019 | Bergin | |
| D862,668 S | 10/2019 | Moseley | |
| D865,914 S | 11/2019 | Snyder | |
| D865,926 S | 11/2019 | Moseley | |
| 10,508,867 B2 | 12/2019 | Dowell, Jr. et al. | |
| 10,589,593 B2 | 3/2020 | Westendarp et al. | |
| D884,870 S | 5/2020 | Bergin | |
| 10,675,941 B2 | 6/2020 | Williamson et al. | |
| 10,696,129 B2 | 6/2020 | Bergin | |
| D905,217 S | 12/2020 | Hederstierna et al. | |
| D907,183 S | 1/2021 | Meda et al. | |
| 10,941,955 B2 | 3/2021 | Heral | |
| D915,569 S | 4/2021 | Meda et al. | |
| D917,036 S | 4/2021 | Jederstierna et al. | |
| 11,034,208 B2 | 6/2021 | Williamson et al. | |
| D940,289 S | 1/2022 | Hederstierna et al. | |
| D944,374 S | 2/2022 | Hederstierna et al. | |
| D956,940 S | 7/2022 | Meda et al. | |
| 11,376,925 B2 | 7/2022 | Williamson et al. | |
| 2001/0041063 A1* | 11/2001 | Rixen | B60N 3/18 |
| | | | 392/496 |
| 2003/0062423 A1* | 4/2003 | Rixen | B60H 1/00364 |
| | | | 237/19 |
| 2003/0230633 A1* | 12/2003 | Rixen | F23N 3/08 |
| | | | 165/96 |
| 2003/0234296 A1* | 12/2003 | Rixen | F23N 3/08 |
| | | | 237/69 |
| 2005/0160709 A1 | 7/2005 | Hollis | |
| 2006/0052050 A1 | 3/2006 | Malott et al. | |
| 2007/0034702 A1* | 2/2007 | Rixen | B60H 1/2206 |
| | | | 237/2 A |
| 2007/0227693 A1 | 10/2007 | Allen et al. | |
| 2008/0202138 A1 | 8/2008 | Pabisz et al. | |
| 2009/0209193 A1 | 8/2009 | Kloster et al. | |
| 2012/0091214 A1* | 4/2012 | Rixen | B60H 1/00364 |
| | | | 237/5 |
| 2012/0247716 A1* | 10/2012 | Galtz | B60L 50/16 |
| | | | 165/41 |
| 2013/0205811 A1 | 8/2013 | Esch | |
| 2014/0223928 A1 | 8/2014 | Esch | |
| 2020/0148028 A1 | 5/2020 | Westendarp et al. | |
| 2020/0198438 A1 | 6/2020 | Liu et al. | |
| 2020/0298655 A1 | 9/2020 | Williamson et al. | |
| 2020/0338951 A1 | 10/2020 | Paci et al. | |
| 2020/0376993 A1 | 12/2020 | Jun et al. | |
| 2021/0061054 A1 | 3/2021 | Meda et al. | |
| 2021/0061058 A1 | 3/2021 | Meda et al. | |
| 2021/0061060 A1 | 3/2021 | Meda et al. | |
| 2021/0207882 A1 | 7/2021 | Jurek | |
| 2021/0239105 A1 | 8/2021 | Allard et al. | |
| 2021/0276396 A1 | 9/2021 | Jurek | |
| 2021/0354526 A1 | 11/2021 | Williamson et al. | |
| 2022/0001718 A1 | 1/2022 | Jurek | |
| 2022/0009306 A1 | 1/2022 | Hornung | |
| 2022/0063369 A1 | 3/2022 | Chen et al. | |
| 2022/0118822 A1* | 4/2022 | Gutowski | B60H 1/00021 |
| 2022/0169090 A1 | 6/2022 | Peter et al. | |
| 2022/0176775 A1 | 6/2022 | Jurek et al. | |
| 2022/0227200 A1 | 7/2022 | Hildebrand | |

FOREIGN PATENT DOCUMENTS

| | | |
|---|---|---|
| AU | 2007202766 A1 | 1/2008 |
| AU | 2007237183 A1 | 6/2008 |
| AU | 2009233601 A1 | 6/2010 |
| AU | 2012261549 A1 | 1/2013 |
| AU | 354553 S | 3/2014 |
| AU | 360022 S | 1/2015 |
| AU | 360131 S | 1/2015 |
| AU | 360132 S | 1/2015 |
| AU | 367405 S | 3/2016 |
| AU | 201610870 S | 4/2016 |
| AU | 201611751 S | 5/2016 |
| AU | 201612249 S | 5/2016 |
| AU | 201613590 S | 7/2016 |
| AU | 201613591 S | 7/2016 |
| AU | 201613592 S | 7/2016 |
| AU | 201613593 S | 7/2016 |
| AU | 2016101949 A4 | 12/2016 |
| AU | 2017100215 A4 | 3/2017 |
| AU | 201712794 S | 5/2017 |
| AU | 201712798 S | 5/2017 |
| AU | 2017200186 A1 | 8/2017 |
| AU | 201810968 S | 3/2018 |
| AU | 201810969 S | 3/2018 |
| AU | 201810970 S | 3/2018 |
| AU | 201810971 S | 3/2018 |
| AU | 201810972 S | 3/2018 |
| AU | 201810973 S | 3/2018 |
| AU | 201810975 S | 3/2018 |
| AU | 201810977 S | 3/2018 |
| AU | 201810978 S | 3/2018 |
| AU | 201816419 S | 1/2019 |
| AU | 201910037 S | 2/2019 |
| AU | 201910038 S | 2/2019 |
| AU | 201911094 S | 4/2019 |
| AU | 201912125 S | 6/2019 |
| AU | 2017364256 A1 | 6/2019 |
| AU | 2015289763 B2 | 10/2019 |
| AU | 2019202512 A1 | 10/2019 |
| AU | 201915241 S | 12/2019 |

(56) References Cited

FOREIGN PATENT DOCUMENTS

| | | | |
|---|---|---|---|
| AU | 201916406 S | 12/2019 |
| AU | 201916408 S | 12/2019 |
| AU | 201916409 S | 12/2019 |
| AU | 2018366469 A1 | 5/2020 |
| AU | 202016120 S | 1/2021 |
| AU | 202016121 S | 1/2021 |
| AU | 202016122 S | 1/2021 |
| AU | 202016123 S | 1/2021 |
| AU | 2020365568 A1 | 4/2022 |
| AU | 2017222698 B2 | 6/2022 |
| CA | 2518348 A1 | 3/2006 |
| CA | 2578651 A1 | 8/2007 |
| CA | 2587994 A1 | 12/2007 |
| CA | 2611822 A1 | 5/2008 |
| CA | 2686403 A1 | 5/2010 |
| CA | 2906348 A1 | 9/2014 |
| CA | 166803 S | 3/2016 |
| CA | 166804 S | 3/2016 |
| CA | 165232 S | 5/2016 |
| CA | 165233 S | 5/2016 |
| CA | 167369 S | 12/2016 |
| CA | 170638 S | 12/2016 |
| CA | 167431 S | 2/2017 |
| CA | 172872 S | 2/2017 |
| CA | 172873 S | 2/2017 |
| CA | 172874 S | 2/2017 |
| CA | 2951956 C | 3/2022 |
| CA | 2954152 C | 3/2022 |
| CN | 103237671 A | 8/2013 |
| CN | 103687735 A | 3/2014 |
| CN | 106470856 A | 3/2017 |
| CN | 106976376 A | 7/2017 |
| CN | 109070688 A | 12/2018 |
| CN | 305029216 S | 2/2019 |
| CN | 305029217 S | 2/2019 |
| CN | 305029218 S | 2/2019 |
| CN | 305105066 S | 4/2019 |
| CN | 110293813 A | 10/2019 |
| CN | 110385958 A | 10/2019 |
| CN | 305397384 S | 10/2019 |
| CN | 111344168 A | 6/2020 |
| CN | 213237518 U | 5/2021 |
| CN | 213237945 U | 5/2021 |
| CN | 306672354 S | 7/2021 |
| CN | 306681352 S | 7/2021 |
| CN | 306901266 S | 10/2021 |
| CN | 216636079 U | 5/2022 |
| CN | 114585528 A | 6/2022 |
| CN | 307425658 S | 6/2022 |
| CN | 307425659 S | 6/2022 |
| CN | 307449465 S | 7/2022 |
| DE | 19654261 A1 | 6/1998 |
| DE | 19730136 A1 | 1/1999 |
| DE | 69503723 T2 | 4/1999 |
| DE | 69414190 T2 | 6/1999 |
| DE | 69817899 T2 | 5/2004 |
| DE | 202004003914 U1 | 5/2004 |
| DE | 10255833 A1 | 6/2004 |
| DE | 10336767 B3 | 12/2004 |
| DE | 59812376 D1 | 1/2005 |
| DE | 202004007924 U1 | 10/2005 |
| DE | 202005013530 U1 | 11/2005 |
| DE | 202004017266 U1 | 4/2006 |
| DE | 202005000560 U1 | 6/2006 |
| DE | 102005030362 B3 | 11/2006 |
| DE | 202006001377 U1 | 5/2007 |
| DE | 602004004480 T2 | 5/2007 |
| DE | 202006001374 U1 | 6/2007 |
| DE | 202006001376 U1 | 6/2007 |
| DE | 202006009803 U1 | 11/2007 |
| DE | 202007006292 U1 | 9/2008 |
| DE | 102007038716 A1 | 2/2009 |
| DE | 602005012194 D1 | 2/2009 |
| DE | 202008003123 U1 | 7/2009 |
| DE | 102008028066 A1 | 12/2009 |

| | | | | |
|---|---|---|---|---|
| DE | 602007009584 D1 | 11/2010 | | |
| DE | 502007006725 D1 | 4/2011 | | |
| DE | 202011101256 U1 | 11/2011 | | |
| DE | 202010012578 U1 | 12/2011 | | |
| DE | 202011002986 U1 | 6/2014 | | |
| DE | 202013004158 U1 | 8/2014 | | |
| DE | 102016220768 A1 | 4/2018 | | |
| DE | 112017000915 T5 | 10/2018 | | |
| DE | 102017207797 A1 | 11/2018 | | |
| DE | 102017214941 A1 | 2/2019 | | |
| DE | 102017219353 A1 | 5/2019 | | |
| DE | 112017005541 T5 | 8/2019 | | |
| DE | 102018204532 A1 | 9/2019 | | |
| DE | 102018206490 A1 | 10/2019 | | |
| DE | 102019205194 A1 | 10/2019 | | |
| DE | 102018206854 A1 | 11/2019 | | |
| DE | 202015009786 U1 | 2/2020 | | |
| DE | 212018000248 U1 | 2/2020 | | |
| DE | 212018000249 U1 | 2/2020 | | |
| DE | 112018003284 T5 | 3/2020 | | |
| DE | 112018003288 T5 | 4/2020 | | |
| DE | 102018222877 A1 | 6/2020 | | |
| DE | 112018005002 T5 | 7/2020 | | |
| DE | 112018005883 T5 | 7/2020 | | |
| DE | 102020203424 B3 | 7/2021 | | |
| DE | 112020000265 T5 | 9/2021 | | |
| DE | 102020206181 A1 | 11/2021 | | |
| DE | 102020206182 A1 | 11/2021 | | |
| DE | 102020206183 A1 | 11/2021 | | |
| DE | 112020004382 T5 | 6/2022 | | |
| DE | 102021200499 A1 | 7/2022 | | |
| DK | 3543047 T3 | 9/2021 | | |
| EP | 700801 A1 | 3/1996 | | |
| EP | 869018 A2 | 10/1998 | | |
| EP | 892225 A2 | 1/1999 | | |
| EP | 1538009 A1 | 6/2005 | | |
| EP | 1538411 A2 | 6/2005 | | |
| EP | 1634740 A1 | 3/2006 | | |
| EP | 1721765 A1 | 11/2006 | | |
| EP | 1752717 A1 | 2/2007 | | |
| EP | 1826041 A1 | 8/2007 | | |
| EP | 1870270 A1 | 12/2007 | | |
| EP | 1925889 A2 | 5/2008 | | |
| EP | 1955946 A2 | 8/2008 | | |
| EP | 1988612 A2 | 11/2008 | | |
| EP | 2178710 A1 | 4/2010 | | |
| EP | 2189312 A1 | 5/2010 | | |
| EP | 2192040 A1 | 6/2010 | | |
| EP | 2196390 A1 | 6/2010 | | |
| EP | 2433658 A1 | 3/2012 | | |
| EP | 2616258 A1 | 7/2013 | | |
| EP | 2665611 A1 | 11/2013 | | |
| EP | 2714440 A1 | 4/2014 | | |
| EP | 2994326 A1 | 3/2016 | | |
| EP | 3113965 A1 | 1/2017 | | |
| EP | 3150916 A1 * | 4/2017 | .............. F23N 1/02 |
| EP | 3156728 A1 * | 4/2017 | ............. F23K 5/005 |
| EP | 3241695 A3 | 4/2018 | | |
| EP | 3303965 A2 | 4/2018 | | |
| EP | 3401619 A1 | 11/2018 | | |
| EP | 3411250 A1 | 12/2018 | | |
| EP | 3476630 A1 | 5/2019 | | |
| EP | 3543047 A1 | 9/2019 | | |
| EP | 3564564 A1 | 11/2019 | | |
| EP | 3592585 B1 | 5/2021 | | |
| JP | 2005164231 A | 6/2005 | | |
| KR | 101773015 B1 * | 9/2017 | | |
| KR | 102049201 B1 | 1/2020 | | |
| RU | 2753994 C2 | 8/2021 | | |
| WO | 2009021994 A1 | 2/2009 | | |
| WO | 2012034695 A1 | 3/2012 | | |
| WO | 2012113538 A1 | 8/2012 | | |
| WO | 2012159749 A1 | 11/2012 | | |
| WO | 2014143181 A1 | 9/2014 | | |
| WO | 2014180559 A1 | 11/2014 | | |
| WO | 2016011073 A1 | 1/2016 | | |
| WO | 2016189520 A2 | 12/2016 | | |
| WO | 2017143393 A1 | 8/2017 | | |
| WO | 2017143394 A1 | 8/2017 | | |

(56)          References Cited

FOREIGN PATENT DOCUMENTS

| WO | 2018096127 A1 | 5/2018 |
|---|---|---|
| WO | 2019025633 A1 | 2/2019 |
| WO | 2019025634 A1 | 2/2019 |
| WO | 2019025635 A1 | 2/2019 |
| WO | 2019025636 A1 | 2/2019 |
| WO | 2019038023 A1 | 2/2019 |
| WO | 2019082168 A1 | 5/2019 |
| WO | 2019097448 A1 | 5/2019 |
| WO | 2019207451 A2 | 10/2019 |
| WO | 2019229706 A1 | 12/2019 |
| WO | 2019244011 A1 | 12/2019 |
| WO | 2020151541 A1 | 7/2020 |
| WO | 2020188485 A2 | 9/2020 |
| WO | 2020192746 A1 | 10/2020 |
| WO | 2021074841 A1 | 4/2021 |
| WO | 2021186414 A1 | 9/2021 |
| WO | 2021228601 A1 | 11/2021 |
| WO | 2021228605 A1 | 11/2021 |
| WO | 2021228620 A1 | 11/2021 |
| WO | 2022105851 A1 | 5/2022 |
| WO | 2022162534 A1 | 8/2022 |

OTHER PUBLICATIONS

Examination Report Issued in German Patent Application No. 102021200499.7 mailed on Oct. 12, 2021.

German Patent Application No. 102021200499.7 titled "Heating Arrangement and Heat Distribution Unit for Such a Heating Arrangement" filed on Jan. 20, 2021.

PCT Application No. PCT/IB2022/057429 titled "Ion Generator and System with Mobile HVAC" filed on Aug. 9, 2022.

Design U.S. Appl. No. 29/767,929 titled "Air Conditioning Housing" filed on Jan. 26, 2021.

Design U.S. Appl. No. 29/774,535 titled "Air Distribution Box" filed on Mar. 17, 2021.

U.S. Appl. No. 17/768,781 titled "Air Conditioning Apparatus for Recreational Vehicles" filed on Apr. 13, 2022.

Design U.S. Appl. No. 29/840,307 titled "Filter Housing" filed on May 27, 2022.

U.S. Appl. No. 17/854,869 titled "Air Distribution Apparatus" filed on Jun. 30, 2022.

Design U.S. Appl. No. 29/641,674 titled "Control Panel" filed on Mar. 23, 2018.

Design U.S. Appl. No. 29/758,314 titled "Air Conditioning Apparatus" filed on Nov. 13, 2020.

Design U.S. Appl. No. 29/798,939 titled "Housing Shroud and Housing for an Air Conditioner" filed on Jul. 12, 2021.

Design U.S. Appl. No. 29/803,390 titled "Housing for an Ion Generator" filed on Aug. 12, 2021.

U.S. Appl. No. 17/884,135 titled "Ion Generator and System with Mobile HVAC" filed on Aug. 12, 2021.

Design U.S. Appl. No. 29/816,164 titled "Housing for an Ion Generator" filed on Nov. 19, 2021.

Design U.S. Appl. No. 29/826,755 titled "Housing (Inventilate—Rooftop Heat Exchanger—[Embodiment tbc])" filed on Feb. 15, 2022.

Design U.S. Appl. No. 29/826,757 titled "Housing (Shape (2020)—further catchword TBC)" filed on Feb. 15, 2022.

Dometic Catalog—Climate Control 2015.

Dometic Catalog—Climate Control 2016.

Office Action Issued in German Patent Application No. 102021200499.7 mailed on Mar. 27, 2024.

* cited by examiner

HEATING ARRANGEMENT AND HEAT DISTRIBUTION UNIT FOR SUCH A HEATING ARRANGEMENT

CLAIM TO PRIORITY

This non-provisional patent application claims priority to and benefit of, under 35 U.S.C. § 119(e), German Patent Application DE 102021200499.7, filed Jan. 20, 2021 and titled "Heating Arrangement and Heat Distribution Unit for Such a Heating Arrangement", all of which is incorporated by reference herein.

BACKGROUND

1. Field of the Invention

This invention relates to a heating arrangement and to a heat distribution unit for such a heating arrangement.

2. Description of the Related Art

Various quite different solutions for heating arrangements are known in the state of the art. This holds in particular for heating arrangements in recreational vehicles, like campers or caravans. Although, in recreational vehicles heating arrangements are quite suitable to provide several components and/or areas or zones of a recreational vehicle with heat, commonly several distinct heating apparatuses are combined to end up with a universal heating arrangement. For example, one first heating apparatus is provided to supply a floor heating with hot heating liquid. In addition, a second heating apparatus is coupled to a water supply line of water for sanitary and/or cooking purposes to heat said water prior to use. Finally, a third heating apparatus configured to heat the air within the recreational vehicle is provided. All these heating apparatuses are provided independently to each other as separate apparatuses but from together a universal heating arrangement of the recreational vehicle. Such conglomerated configurations often suffer from problems in compatibility of its distinct components and require large space. Sometimes, such conglomerated configurations offer a lower overall efficiency. Moreover, such conglomerated configurations are often expensive and maintenance-intensive, as each component has to be bought and maintained separately as in many cases only single components are available but no overall solution.

Accordingly, there is much space for further developments of such heating arrangements. In particular, a long-term desire exists for an overall all-in-one solution for such a heating arrangement.

SUMMARY

Present embodiments provide a heating arrangement which overcomes at least some of the aforementioned drawbacks of prior art arrangements.

This heating arrangement and the corresponding heat distribution unit are defined by the appended independent claims. Modifications for the heating arrangement are to be found in the dependent claims.

According to a first aspect, a heating arrangement, in particular a heating arrangement for recreational vehicles like campers or caravans, comprises a heating apparatus and a heat distribution unit. The heating apparatus comprises a heating unit configured to generate hot air and a first heat exchanging unit and a second heat exchanging unit. The first heat exchanging unit and the second heat exchanging unit are coupled to the heating unit to receive the hot air from the heating unit independently of each other. The first heat exchanging unit is configured for heat exchange between the hot air and a heating liquid. The second heat exchanging unit is configured for heat exchange between the hot air and ventilation air. The heat distribution unit comprises a hot heating liquid input connection coupled to the first heat exchanging unit such that the heat distribution unit can receive hot heating liquid from the first heat exchanging unit therethrough. The heat distribution unit comprises further a hot heating liquid output connection configured to be coupled to a hot heating liquid input connection of an external heating device. The heat distribution unit comprises a third heat exchanging unit. The third heat exchanging unit is configured to be coupled to an external liquid supply line and is further configured for heat exchange between the received hot heating liquid from the first heat exchange unit and liquid guided through the external liquid supply line.

Such a heating arrangement is configured to heat ventilation air, a liquid guided through the external liquid supply line and to provide the external heating device with hot heating liquid at the same time. For this, only one single heating apparatus supplemented with an appropriate heat distribution unit is to be provided. Thus, the total number of separate apparatuses forming the heating arrangement is reduced considerably. Moreover, the maintenance of the heating arrangement is simplified. According to the invention only one single heating apparatus and the heat distribution unit is to be maintained, instead of a maintenance of various distinct apparatuses from various suppliers combined with each other to form the heating arrangement. Finally, the required space is reduced considerably. According to the invention, distinct components like the heating unit of the heating apparatus are used to provide heat for various purposes. Thus, thanks to the invention it is not necessary to be provide a single component for each separate purpose.

The heat distribution unit is configured such that the external liquid supply line can be a standard water supply line of a recreational vehicle provided to supply water for sanitary and/or cooking purposes. Such a configuration allows to heat water for sanitary and/or cooking purposes with the heating arrangement in a simple and direct manner.

The heat distribution unit is configured such that the external heating device can be a floor heating of a recreational vehicle. Such a configuration allows to heat the floor of the recreational vehicle directly with the heating liquid from the heating apparatus in a simple and direct manner.

The third heat exchanging unit comprises a cold liquid input connection. The cold liquid input connection is configured to be coupled to a cold liquid supply of the external liquid supply line. Further, the third heat exchanging unit comprises a hot liquid output connection configured to be coupled to a hot liquid output device via the external liquid supply line. With such a configuration, the heating arrangement, and in particular the third heat exchanging unit of the heating arrangement, can be coupled thermally to the external liquid supply line in a simple and straight-forward manner.

The third heat exchanging unit is a high efficiency liquid to liquid heat exchanger. Such a configuration allows to increase the overall efficiency of the heating arrangement.

The heat distribution unit comprises a hot heating liquid main flow path leading from the hot heating liquid input connection of the heat distribution unit directly to the hot heating liquid output connection of the heat distribution unit.

In addition, the heat distribution unit comprises a hot heating liquid side flow path branching off from the hot heating liquid main flow path and leading to the third heat exchanging unit. Thus, the flow of hot heating liquid towards the third heat exchanging unit is branched off from the main flow path, resulting in a highly flexible and functional overall configuration.

The heat distribution unit comprises a valve unit configured to control the amount of hot heating liquid branched off from the hot heating liquid main flow path into the hot heating liquid side flow path towards the third heat exchanging unit. Such a configuration allows to control the amount of heat supplied to the third heat exchanging unit for heat exchange with the liquid guided through the external liquid supply line.

The heating arrangement comprises a heating liquid pump configured to force a flow of the heating liquid through the heating arrangement. Such a configuration allows better control of the operation of the heating arrangement and at the same time improves the overall efficiency of the heating arrangement. In particular, the heating liquid pump is provided as component of the heat distribution unit. Thus, it is not necessary to equip the heating apparatus with such a heating liquid pump such that the heating apparatus can also be used for other configurations than for the heating arrangement. This allows to reduce the producing costs for the heating apparatus as in particular the use thereof is not limited to the discussed heating arrangements.

The heating apparatus comprises a cool heating liquid input connection. The cool heating liquid input connection is configured to be connected directly to a cool heating liquid output connection of said external heating device. Alternatively, the heat distribution unit comprises a cool heating liquid input connection configured to be connected to a cool heating liquid output connection of said external heating device, and a cool heating liquid output connection configured to be coupled to said cool heating liquid input connection of the heating apparatus. Thus, the heating liquid circle can be closed either via the heat distribution unit or directly with the heating apparatus. Of course, the heating arrangement can be configured such that it can be set up in both configurations. Thus, a user can choose between configurations.

The second aspect of the present invention refers to the heat distribution unit for and/or of any one of the above described the heating arrangements. Such an appropriate heat distribution unit is required to form such heating arrangements according to the present invention.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

These and other features of the present embodiments will become more apparent from the following detailed description with reference to the accompanying drawings, in which.

DETAILED DESCRIPTION

At first, the concrete configuration of a heating apparatus 1 suitable to be used in a heating arrangement 100 (FIG. 12) according to the present invention will be described in detail in view of FIGS. 1 to 11. Finally, the specific configuration of an exemplary embodiment of a heating arrangement 100 according to the present invention will be described with reference to FIG. 12.

Figure 1:
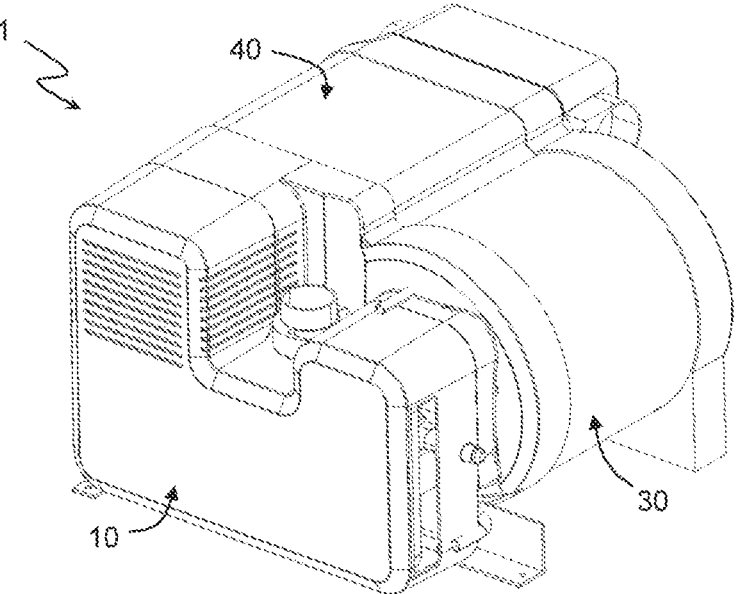
FIG. 1 is a spatial view of an exemplary heating apparatus for a heating arrangement according to one exemplary embodiment.
Figure 2:
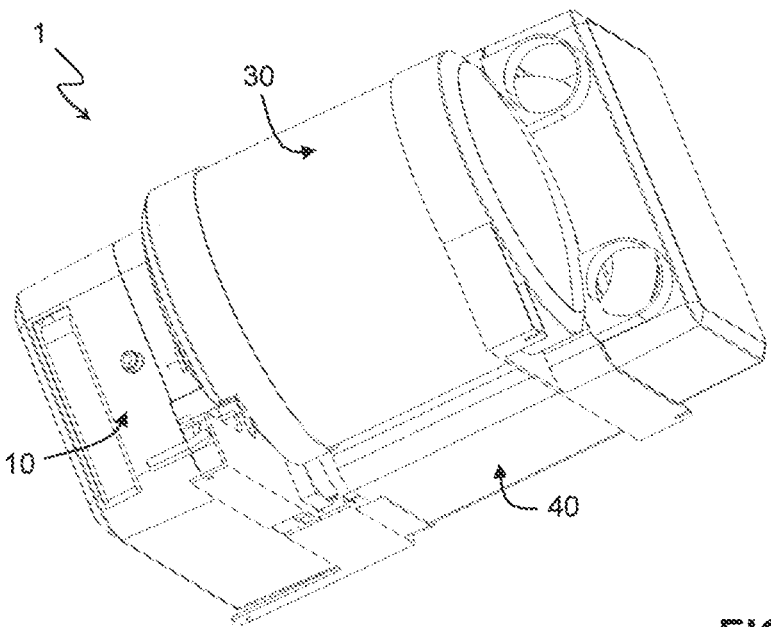
FIG. 2 is a further spatial view of the heating apparatus of FIG. 1.
Figure 3:
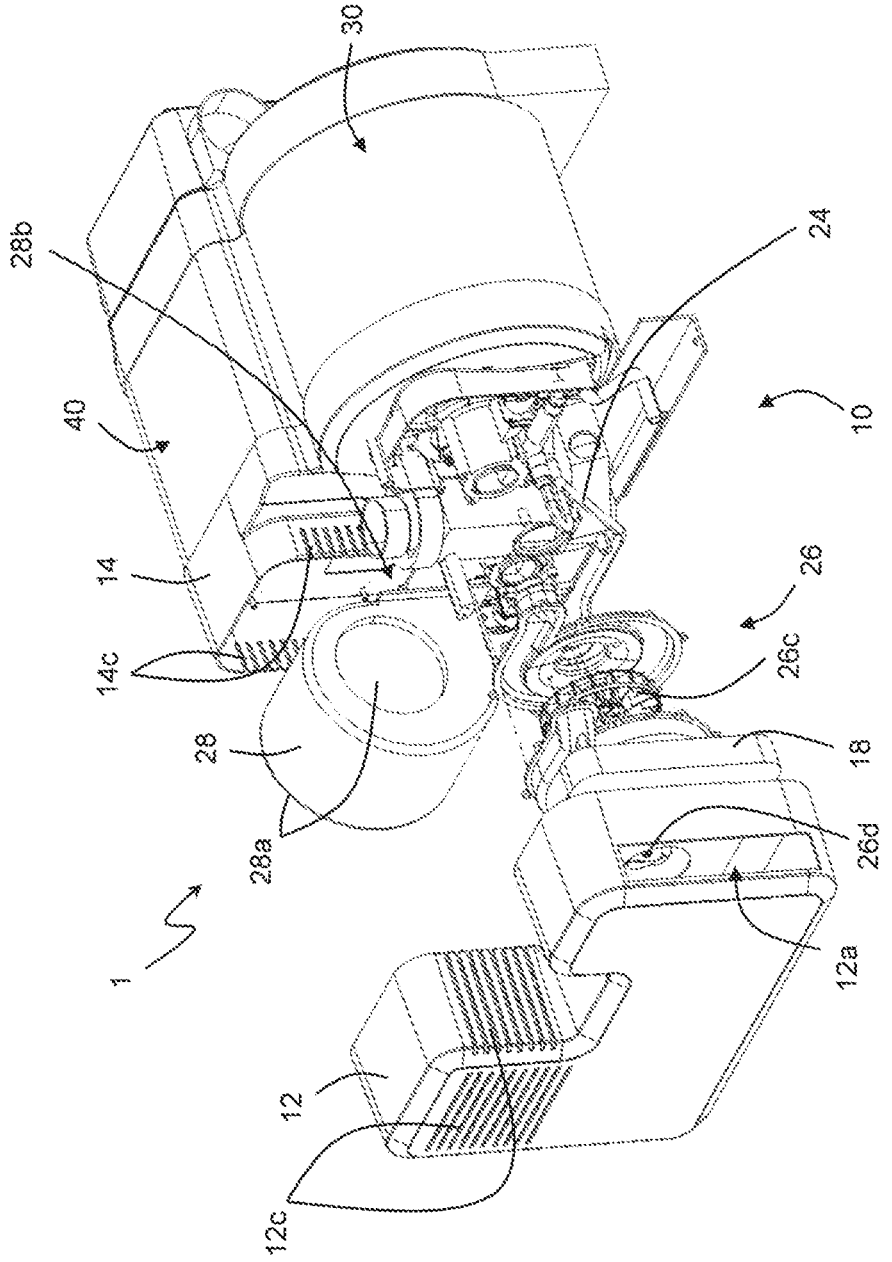
FIG. 3 is a partially exploded illustration of the heating apparatus of FIGS. 1 and 2.

As can be seen in FIGS. 1 to 3, an appropriate heating apparatus 1 comprises a heating unit 10, a first heat exchanging unit 30 and a second heat exchanging unit 40. The first heat exchanging unit 30 and the second heat exchanging unit 40 are both coupled to the heating unit 10 to receive hot air from the heating unit 10 independently of each other. In the illustrated embodiment, the first heat exchanging unit 30 and the second heat exchanging unit 40 are both coupled to the heating unit 10 in parallel with each other.

The heating unit 10 comprises a primary housing 12, a secondary housing 14 and a coupling member 16 (FIG. 4). The primary housing 12, the secondary housing 14 and the coupling member 16 are coupled to each other and house further components of the heating unit 10. The secondary housing 14 is coupled fixedly, for example via screw members, to the coupling member 16. Alternatively, the secondary housing 14 can be formed integrally with the coupling member 16 as one-piece unitary member. The primary housing 12 of the heating unit 10 is coupled to the secondary housing 14 and to the coupling member 16 in a releasable manner. For example, the primary housing 12 of the heating unit 10 is coupled to the secondary housing 14 and to the coupling member 16 via clamping members or via a form fitting. This results in a configuration in which the primary housing 12 can be disengaged from the secondary housing 14 and the coupling member 16 in an easy and simple manner. This enables easy access to the interior components of the heating unit 10 for maintenance or the like. However, alternatively the primary housing 12 can be coupled to the secondary housing 14 and/or to the coupling member 16 via a configuration requiring the use of appropriate tools for disengagement.

The primary housing 12 is provided with an opening 12a. The opening 12a is covered with a removable lid (not illustrated). The lid allows access to the interior of the heating unit 10 in an easy but limited manner. The opening 12a is, for example, provided to enable a user to connect electrical connections for power, control and/or 230 V_AC electrical power to a circuit panel of a printed circuit board assembly (described later) of the heating unit 10. In addition or alternatively, via the opening 12a other desired operations on the interior components of the heating unit 10 are possible without the need of removing the primary housing 12 or parts thereof.

At least the primary housing 12, in particular also the secondary housing 14, is provided with some ventilation slots 12c and 14c. The ventilation slots 12c, 14c allow air from the exterior of the heating apparatus 1 to enter the interior of the heating unit 10. In the illustrated configuration, in the assembled state of the heating unit 10 the ventilation slots 14c provided in the secondary housing 14 are configured to extend corresponding ventilation slots 12c provided within the primary housing 12. In the present embodiment, on each of three different sides of the primary housing 12 a set of eight horizontal ventilation slots 12c is provided. However, also configurations with more or less than eight ventilation slots 12c per side, and/or other structural configurations for the ventilation slots 12c and 14c, like for example ventilation slots having circular or elliptical shapes or ventilation slots extending in vertical direction, are possible.

Figure 4A:
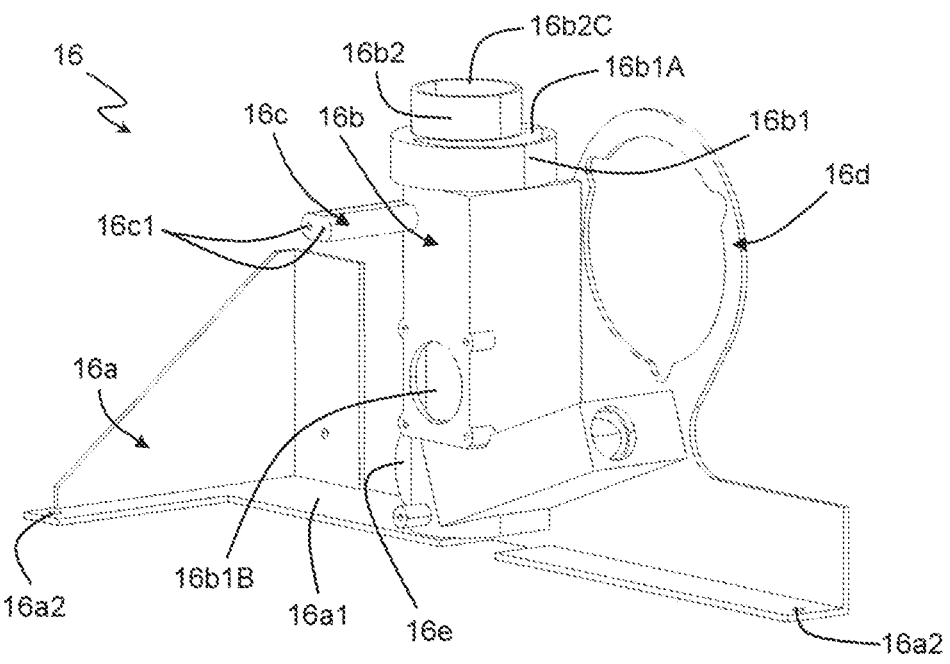
FIG. 4A is a spatial view of an exemplary coupling member for the heating apparatus of FIGS. 1 to 3.
Figure 4B:
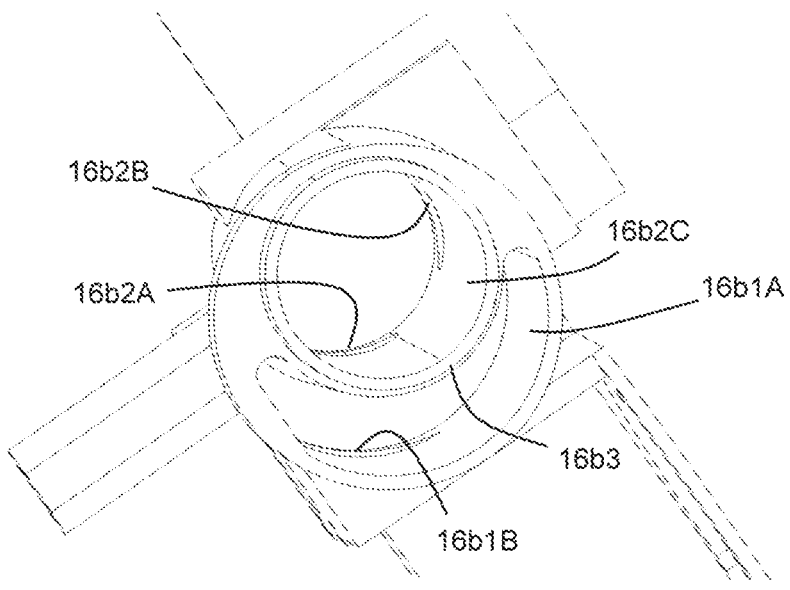
FIG. 4B is an enlarged spatial view of the coupling member of FIG. 4A.

As illustrated in FIGS. 4A and 4B the coupling member 16 comprises basically a base portion 16a, a preheating portion 16b, a printed circuit board assembly coupling portion 16c, and two burner coupling portions 16d and 16e coupled to each other. Here, the coupling member 16 is a one-piece unitary member. The coupling member 16 can thus be formed in a single cast process. However, some or all of the various portions 16a to 16e of the coupling member 16 can be provided as independent parts coupled to each other in an appropriate manner. For example, the independent parts can be coupled to each other with screws or bolts, but of course other suitable means are possible as well.

The base portion 16a of the coupling member 16 comprises a bearing surface 16a1. The bearing surface 16a1 has a plurality of through holes 16a2. In the present configuration the bearing surface 16a1 has two through holes 16a2. The number of through holes 16a2 can vary depending on the specific need. The through holes 16a2 allow appropriate bolts or screws to pass therethrough. Thus, the base portion 16a of the coupling member 16 can be fixed to a surface of the recreational vehicle like, for example, a wall, floor or ceiling area of the recreational vehicle or to any other suitable surface by the bolts or screws. The base portion 16a can be integrated into the secondary housing 14.

The preheating portion 16b comprises a combustion air flow duct 16b1 and an exhaust gases flow duct 16b2. The exhaust gases flow duct 16b2 is completely enveloped by the combustion air flow duct 16b1. The two flow ducts 16b1 and 16b2 are at least partly separated from each other by only one heat transmitting separation wall 16b3. Thus, heat is transferred between air within the two air flow ducts 16b1 and 16b2. The combustion air flow duct 16b1 comprises an inlet opening 16b1A and an outlet opening 16b1B. The exhaust gases flow duct 16b2 comprises two inlet openings 16b2A and 16b2B as well an outlet opening 16b2C coupled to each other, respectively.

The printed circuit board assembly coupling portion 16c is configured to attach a printed circuit board assembly (PCBA) 18 thereto in a releasable manner. In the illustrated configuration this is achieved via appropriate screws (not illustrated) engaging threaded bores 16c1 provided within the PCBA coupling portion 16c. Furthermore, the PCBA coupling portion 16c comprises a port that allows the sensing of the intake air pressure. In other embodiments, the structural element labeled with reference sign 16c is not provided to attach the PCBA 18 thereto. Instead, it is provided for the port for sensing the intake air pressure only.

Each of the two burner coupling portions 16d and 16e is provided as circular frame member having an interior opening and several engaging recesses. A single burner 20 and 22 can be inserted into each of the burner coupling portions 16b and 16a to be coupled to the corresponding heat exchanging unit 30 or 40. Each burner 20 and/or 22 can be locked in this position via appropriate engaging members like screws or bolts (not illustrated).

The heating unit 10 is enclosed by the primary housing 12. In the inner of the heating unit 10 the secondary housing 14 and the coupling member 16, the PCBA 18, two burners 20 (FIG. 10A) and 22 (FIG. 10C), a fuel gas or liquid piping 24 being coupled to the two burners 20 and 22 and having an inlet port configured to be coupled to a storage for fuel gas or liquid (not illustrated), a combustion air fan unit 26 and a ventilation air driving unit 28 are provided. In the scope of the present invention, the term "burner" refers to fuel manifolds, as illustrated. However, also other configurations for burners are possible.

Figure 5:
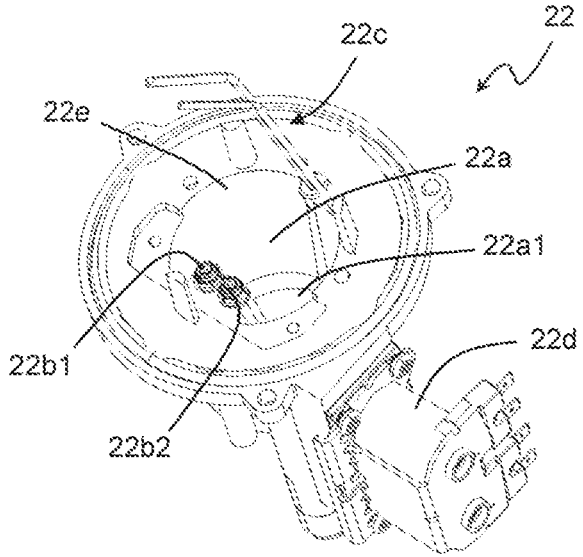
FIG. 5 is a spatial view of an exemplary burner for the heating apparatus of FIGS. 1 to 3.

The two burners 20 and 22 are inserted into the burner coupling portions 16d and 16e of the coupling member 16. The two burners 20 and 22 protrude from the inner of the heating unit 10 with their flame generating side. FIG. 5 illustrates an example for the structural configuration of a dual nozzle fuel manifold of the burners 20 and 22, here in particular an exemplary embodiment of the second burner 22. The first burner 20 can have the same or at least a quite similar configuration. The second burner 22 comprises a combustion air flow duct 22a, several (here in particular two) nozzles 22b1 and 22b2, an ignition arrangement 22c and a controlling arrangement 22d.

The combustion air flow duct 22a is configured to lead a flow of combustion air from a combustion air fan unit 26 coupled to an inlet opening 22a1 of the combustion air flow duct 22a (here the lower end thereof) to a combustion area 22e of the burner 22.

The two nozzles 22b1 and 22b2 are provided with passive flow disturbance devices (not illustrated). The two nozzles 22*b*1 and 22*b*2 receive gas or liquid via a corresponding fuel gas or liquid piping 24 coupled thereto. The two nozzles 22*b*1 and 22*b*2 are thus configured to supply fuel gas or liquid to the combustion area 22*e* of the burner 22. The two nozzles 22*b*1 and 22*b*2 consist of a first nozzle 22*b*1 and a second nozzle 22*b*2. The second nozzle 22*b*2 is differing from the first nozzle 22*b*1 in a cross section of its supplying opening. Accordingly, the first nozzle 22*b*1 and the second nozzle 22*b*2 have different throughput rates.

The ignition arrangement 22*c* is configured to ignite the mixture of combustion air from the combustion air flow duct 22*a* with the fuel gas or liquid from the two nozzles 22*b*. In the illustrated embodiment, the ignition arrangement 22*c* is provided as electric arc or spark generating arrangement having two elongated electrodes. Here, the elongated electrodes serve also as flame detector and feedback unit, which will be referred to later.

The controlling arrangement 22*d* is configured to be coupled to the PCBA 18. The controlling arrangement 22*d* is coupled to the ignition arrangement 22*c* and two fuel gas or liquid valves (not illustrated, but further referred to below). The PCBA 18 is configured to supply electrical power to the ignition arrangement 22*c* to operate the ignition arrangement 22*c* appropriately, for example, by generating an electric arc or spark for ignition within the combustion area. Each of the fuel gas or liquid valves is coupled to one of the two nozzles 22*b*1 and 22*b*2. By the fuel gas or liquid valves, the fuel supply for each of the two nozzles 22*b*1 and 22*b*2 can be controlled independently of each other. Both fuel gas or liquid valves are monostable valves having an opened operation state and a closed state. Such monostable valves are well known in the art, which is why a detailed description thereof is omitted here for the sake of brevity.

With such a configuration, in principle, four states for the fuel supply at the combustion area 22*e* and, thus, four different heat outputs of the second burner 22 can be selected by the controlling arrangement:

In a first operation state, both valves are closed such that no fuel gas or liquid is provided to the combustion area 22*e*. Accordingly, there is no combustion process in the combustion area 22*e* and the heat output is zero.

In a second operation state, the fuel gas or liquid valve coupled to the first nozzle 22*b*1 is opened while the other fuel gas or liquid valve coupled to the second nozzle 22*b*2 is closed. Accordingly, fuel gas or liquid is provided to the combustion area 22*e* as defined by the throughput rate of the first nozzle 22*b*1. This results in a first heat output.

In a third operation state, the fuel gas or liquid valve coupled to the first nozzle 22*b*1 is closed while the fuel gas or liquid valve coupled to the second nozzle 22*b*2 is opened. Accordingly, fuel gas or liquid is provided to the combustion area 22*e* as defined by the throughput rate of the second nozzle 22*b*2. This results in a second heat output differing from the first heat output.

In a fourth operation state, both fuel gas or liquid valves are opened such that fuel gas or liquid is provided to the combustion area 22*e* with a third fuel supply rate defined by the combined throughput rate of the first nozzle 22*b*1 and of the second nozzle 22*b*2. This results in a third heat output, wherein the third heat output substantially corresponds to the sum of the first heat output and the second heat output.

In the illustrated embodiment, the first burner 20 (FIG. 10A) in principle has the same structure as the second burner 22. But in the present configuration the first burner 20 comprises just one single nozzle 20*b*. Moreover, only one fuel gas or liquid valve is provided. In the illustrated embodiment, it is not necessary to provide both burners 20 and 22 with the possibility to switch between four distinct operation states. Thus, providing the first burner 20 with only one nozzle 20*b* can save costs. Nevertheless, the first burner 20 can have the same configuration as the second burner 22, if desired.

Figure 6A:
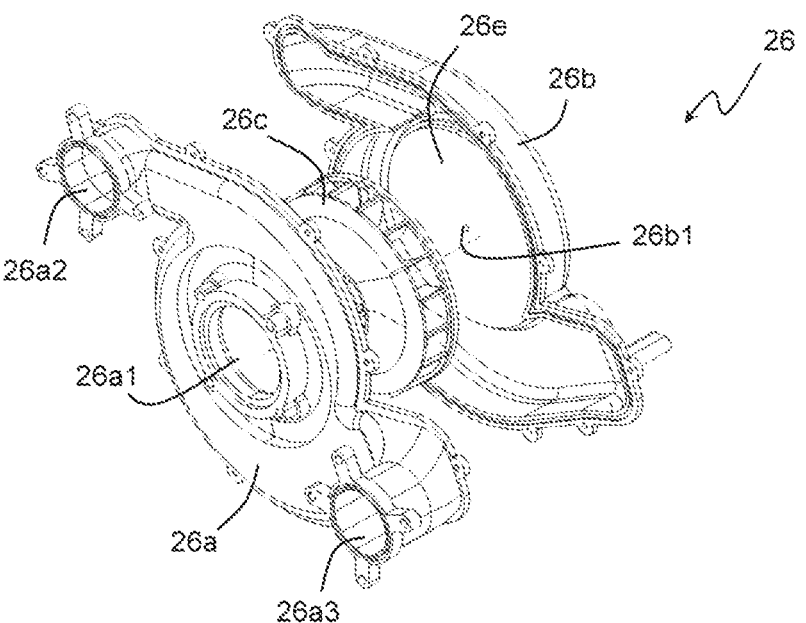
FIG. 6A is an exploded illustration of an exemplary combustion air fan unit for the heating apparatus of FIGS. 1 to 3.

As illustrated in FIG. 6A, the combustion air fan unit 26 comprises a first housing elements 26*a* and a second housing element 26*b*, one single combustion air fan 26*c*, and a combustion air fan driving unit 26*d* (seen in FIG. 3) for the combustion air fan 26*c*.

The first housing element 26*a* comprises a combustion air inlet opening 26*a*1 and two combustion air outlet openings 26*a*2 and 26*a*3. The combustion air inlet opening 26*a*1 is coupled via a common O-ring (not illustrated) to the outlet opening 16*b*1B of the combustion air flow duct 16*b*1. The first outlet opening 26*a*2 of the first housing element 26*a* is coupled via a common O-ring (not illustrated) to the inlet opening of the combustion air flow duct of the first burner 20. The second outlet opening 26*a*3 of the housing element 26*a* is coupled via a common O-ring (not illustrated) to the inlet opening 22*a*1 of the combustion air flow duct 22*a* of the second burner 22.

The second housing element 26*b* is coupled to the first housing element 26*a* with several coupling members, like for example bolts or other suitable coupling means (not illustrated). The first housing element 26*a* and the second housing element 26*b* are configured to form a combustion air flow path. The combustion air flow path leads form the combustion air inlet opening 26*a*1 to a combustion air fan chamber 26*e*. Further, the combustion air flow path leads from the combustion air fan chamber 26*e* via two separate flow path sections to each of the two combustion air outlet openings 26*a*2 and 26*a*3. The two sections of the combustion air flow path leading from the combustion air fan camber 26*e* to the combustion air outlet openings 26*a*2 and 26*a*3 can be provided with combustion air valves. Thus, each of the corresponding sections of the combustion air flow path can be closed by the respective combustion air valve. Thus, it is possible to control the supply of combustion air to the two burners 20 and 22, for example, to enable an emergency shut down of the corresponding burner 20 or 22 and/or to increase the amount of combustion air provided to the other burner 22 or 20 coupled to the section of the combustion air flow path which is still open.

In the present embodiment, the one single combustion air fan 26*c* is provided with one single fan wheel. In particular, the single fan wheel is implemented as an impeller. Such a configuration allows to save space. The combustion air fan 26*c* is positioned within the combustion air fan chamber 26*e* which is formed by the two housing elements 26*a* and 26*b*. The combustion air fan 26*c* is positioned in a plane perpendicular with respect to the central axis of the combustion air inlet opening 26*a*1. In the assembled state of the heating apparatus, the combustion air fan 26*c* is configured to generate a flow of combustion air from the combustion air inlet opening 26*a*1 towards both of the combustion air outlet openings 26*a*2 and 26*a*3 and, thus, to the two burners 20 and 22. As such fans are commonly known, a detailed description thereof is omitted for the sake of brevity.

The combustion air fan driving unit 26*d* is provided on an outer surface of the second housing element 26*b*. A driving rod (not illustrated) extends through a driving rod through hole 26*b*1 provided within the second housing element 26*b*. The combustion air fan driving unit 26*d* is coupled via the driving rod (not illustrated) to the combustion air fan 26*c*. The combustion air fan driving unit 28 is configured to drive the combustion air fan 26c for generating the above described flow of combustion air.

Figure 6B:
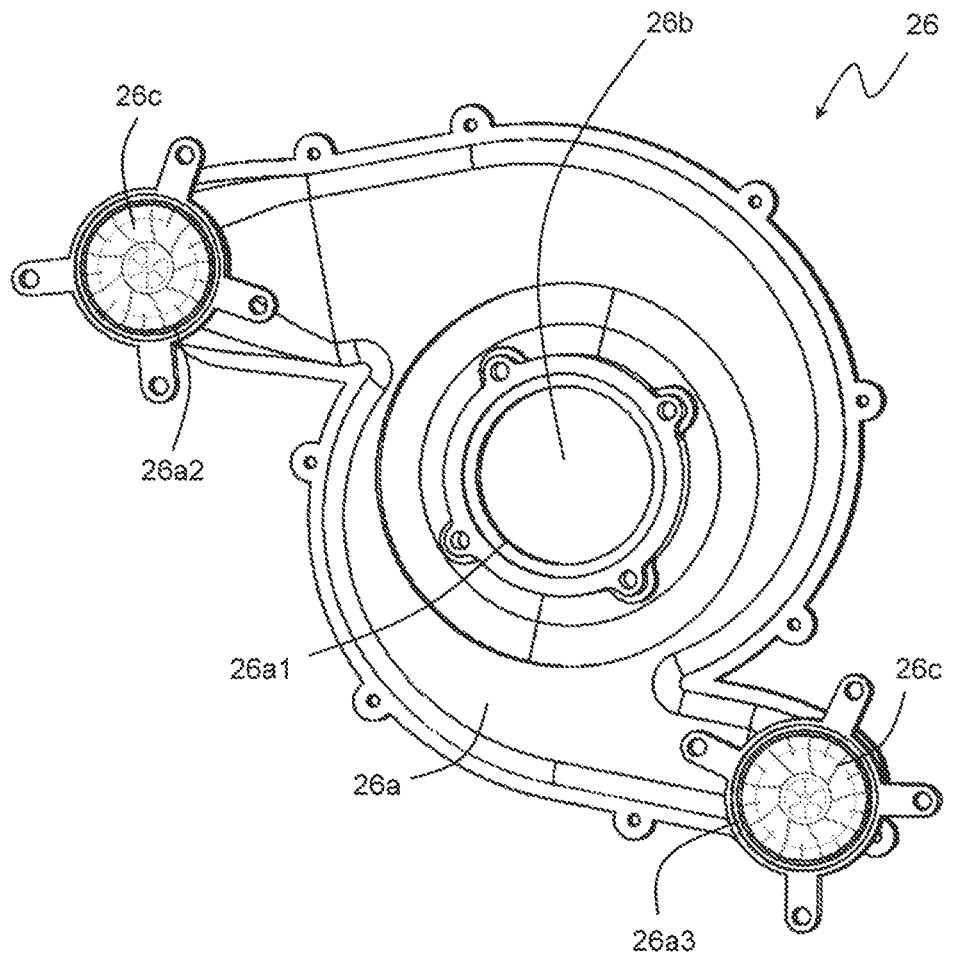
FIG. 6B is a spatial view of another exemplary combustion air fan unit for the heating apparatus of FIGS. 1 to 3.

In FIG. 6B, another example for a combustion air fan unit 26 is illustrated. This combustion air fan unit 26 in this configuration has basically the same structural configuration as the one illustrated in FIG. 6A, but comprises two separate combustion air fans 26c. Each of the two separate combustion air fans 26c is coupled to only one of the two combustion air outlet openings 26a2 and 26a3 (seen along the combustion air flow path). In other words, each distinct combustion air flow path for one of the burners 20 or 22 has its own combustion air fan 26c. Thus, it is possible to set the amount of combustion air provided to each of the two burners 20 and 22 more freely.

Referring to FIG. 3, the ventilation air driving unit 28 is configured to generate, in particular with a ventilation air fan provided in the ventilation air driving unit 28, a flow of ventilation air from an inlet opening 28a of the ventilation air driving unit 28 towards an outlet opening 28b of the ventilation air driving unit 28. As such ventilation air driving units are well-known from the state of the art the detailed description thereof is omitted for the sake of brevity.

Figure 8A:
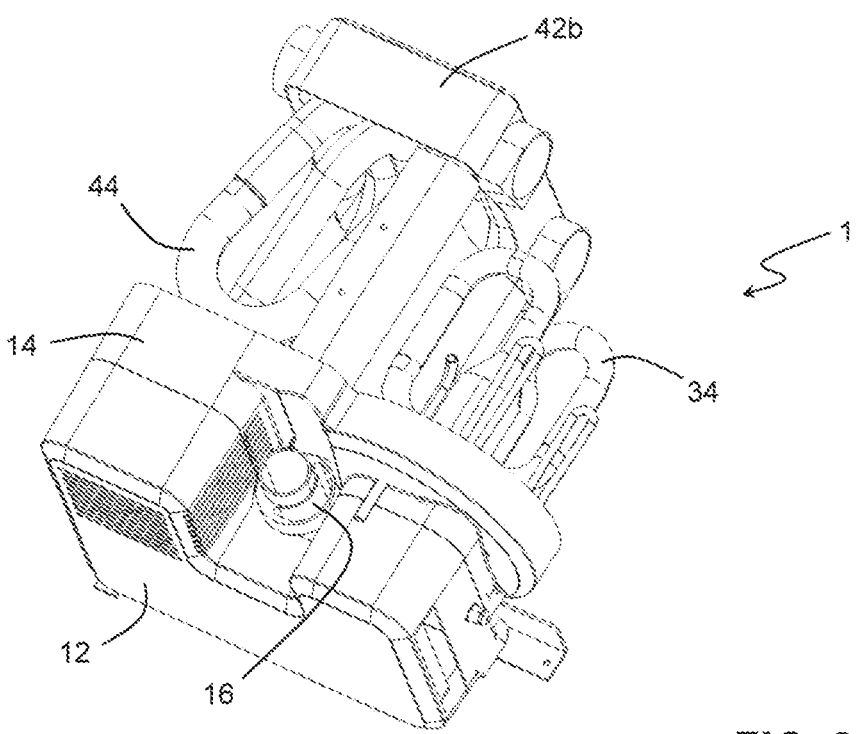
FIGS. 8A to 8C are various spatial views of the heating apparatus of FIGS. 1 to 3 with distinct elements omitted to show the inner structural configuration of said heating apparatus.
Figure 8B:
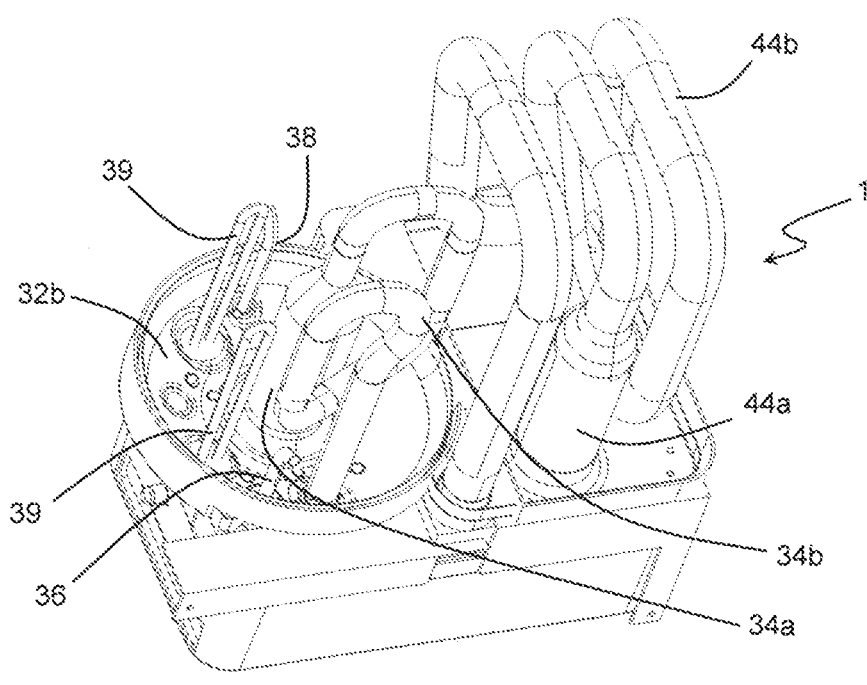
Figure 8C:
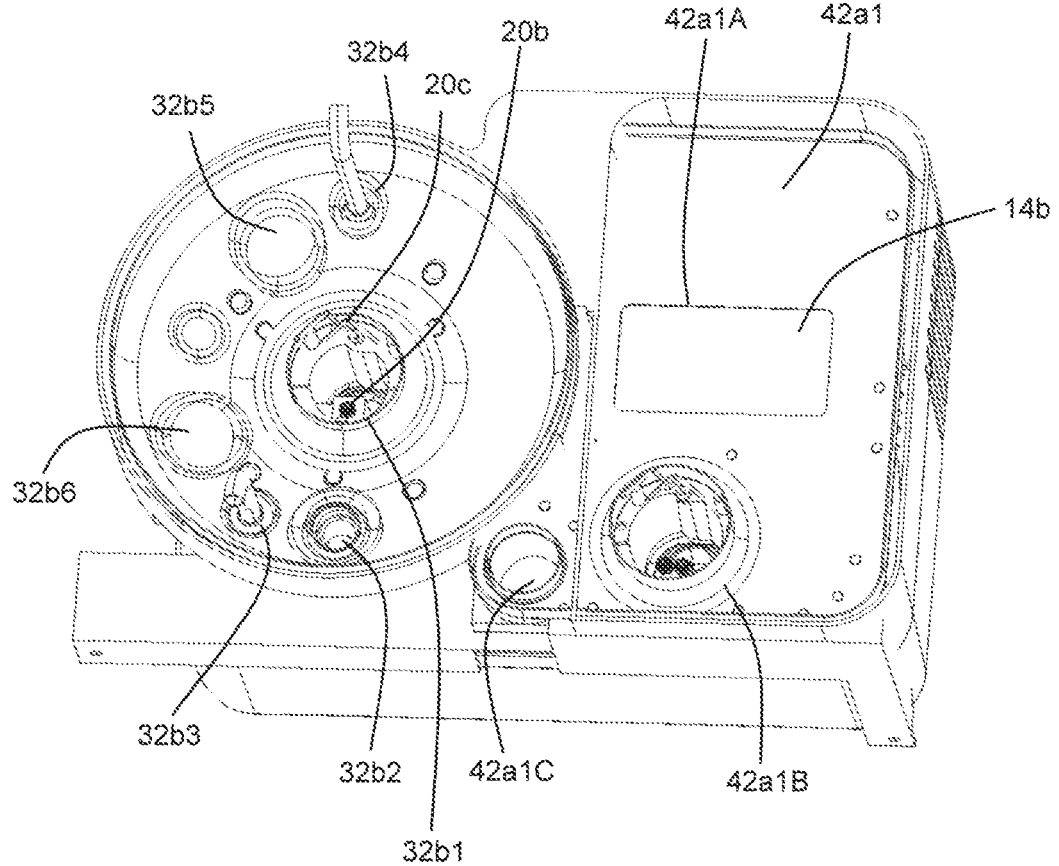

The ventilation air driving unit 28 is coupled, for example with bolts or screws (not illustrated) or by other suitable means, to the secondary housing 14. However, the ventilation air driving unit 28 can also be coupled to one of the other components of the heating apparatus 1. For example, the ventilation air driving unit 28 can be coupled to the coupling member 16. The inlet openings 28a of the ventilation air driving unit 28 are positioned in the vicinity of the ventilation slots 12c and 14c of the housings 12 and 14. As can be seen in FIG. 8C, a ventilation air outlet section 14b is provided within the second heat exchanging unit opening of the secondary housing 14. The outlet opening 28b of the ventilation air driving unit 28 is positioned on the ventilation air outlet section 14b. Thus, the ventilation air driving unit 28 is configured to generate a ventilation air flow from the environment of the heating apparatus 1 through the ventilation slots 12c and 14c to the ventilation air outlet section 14b.

As indicated above, the PCBA 18 is attached with the PCBA coupling portion 16c to the coupling member 16. The PCBA comprises a control signal receiving unit, a processing unit coupled to the signal receiving unit and several control signal wires coupling the processing unit with the controlling arrangement (not shown) of the first burner 20 and the controlling arrangement 22d of the second burner 22, the combustion air fan driving unit 26d, a controlling arrangement of the ventilation air driving unit 28 and a controlling arrangement for a bypass gas valve, which can be provided further.

The control signal receiving unit is configured to receive control signals via wired or wireless communication from a control signal input unit coupled to the control signal receiving unit. The control signal receiving unit is further configured to forward control signals to the processing units. For example, the control signal input unit can be a specific remote-control device or a common smart phone with an appropriate app sending control signals to the control signal receiving unit. This can be achieved by Bluetooth or by other suitable wireless communication. Alternatively, the control signal input unit can be provided as a control panel coupled to the control signal receiving unit via a cable. It is to be noted that control signals do not have to contain only direct control instructions. Control signals can also comprise, for example, various sensor signals. Sensor signals may, for example, come from temperature sensors provided in the heating apparatus or in the recreational vehicle, etc. Moreover, the control input signal unit can be provided as one single device. It can, however, also comprise or consist of several independent devices like serval sensors and/or input devices transmitting control signals to the control signal receiving unit.

The processing unit is configured to receive and to process the control signals received from the control signal receiving unit and to generate appropriate instruction signals for the various components coupled to the processing unit. In particular, the processing unit comprises a memory. The memory can be one of a volatile or non-volatile memory. The memory can contain programs or the like allowing the processing unit to generate appropriate instruction signals from the received control signals. The generated instruction signals do not necessarily have to contain just digital signals, which then have to be processed by the respective components receiving such signals. The generated instruction signals can also include analogue signals for directly operating the respective components. For this purpose, the PCBA 18 further can contain a separate electrical power supply, like for example a battery. Alternatively or in addition thereto, the PCBA 18 can be configured to be coupled to an external energy source, for example like the power grid of the recreational vehicle, etc.

In the illustrated embodiment, the PCBA 18 is configured to control and/or operate the controlling arrangements of the two burners 20 and 22, the combustion air fan driving unit 26d, the ventilation air driving unit 28 and a bypass gas valve, which can be further provided. Further components controlled and/or operated by the PCBA 18 will be discussed later. Within the scope of the present invention also other configurations for the PCBA 18 are possible. In particular, the PCBA 18 can be configured to use information about various temperatures, for example of an air temperature within the recreational vehicle or of the environment of the recreational vehicle, of a liquid temperature, for example of a fuel liquid of the heating apparatus 1 or a liquid to be heated with the heating apparatus 1, etc., various pressure values and/or a flame ionization values of the burners 20 and 22 to control the various components of the heating apparatus 1 in an appropriate manner.

As indicated above, the heating apparatus 1 further comprises a first heat exchanging unit 30 and a second heat exchanging unit 40. Both heat exchanging unit 30, 40 are coupled to the heating unit 10. The first heat exchanging unit 30 and the second heat exchanging unit 40 will be described in the following referring to FIGS. 7 to 8B.

The first heat exchanging unit 30 is configured to allow heat exchange between exhaust gases from the first burner 20 and a heating liquid to be heated. The first heat exchanging unit 30 comprises a liquid tank 32, an exhaust gases piping 34, a cold heating liquid piping 36 and a hot heating liquid piping 38. Both of the cold heating liquid piping 36 and the hot heating liquid piping 38 are provided with connections by which they can be coupled to a heating liquid circuit (not illustrated). In the present configuration the heating liquid is a special liquid for heat transfer. However, in general also water can be used as heating liquid.

The liquid tank 32 comprises a tubular main body 32a. The tubular main body 32a is enclosed on a bottom side thereof by a bottom plate 32a1 and opened on a top side of the main body 32a. The top side of the main body 32a is sealed with a lid member 32b. The lid member 32b has a central exhaust gases inlet opening 32b1, an exhaust gases outlet opening 32b2, a cold heating liquid inlet opening 32b3, a hot heating liquid outlet opening 32b4, two further equipment insertion openings 32b5 and 32b6 and a specific mounting structure. The mounting structure is configured to mount the lid member 32b and thus the liquid tank 32 to the heating unit 10. Alternatively, the further equipment insertion openings 32b5 and/or 32b6 can be moved to the bottom plate 32a1.

The exhaust gases piping 34 is provided to one end thereof with a combustion chamber section 34a. The combustion chamber section 34a is coupled to the lid member 32b of the liquid tank 32 in such a manner that, in the assembled state of the heating apparatus 1, the combustion air flow duct of the first burner 20 is coupled to the combustion chamber section 34a of the exhaust gases piping 34 in a sealed manner. For this, a common O-ring can be provided between the first burner 20 and the exhaust gases piping 34. Moreover, in the assembled state of the heating apparatus 1, the combustion area of the first burner 20 is located within the combustion chamber section 34a of the exhaust gases piping 34 such that the combustion reaction of the first burner 20 can take place in the combustion chamber section 34a of the exhaust gases piping 34.

The exhaust gases piping 34 further has a tubular exhaust gases leading section 34b. The tubular exhaust gases leading section 34b is coupled at one of its ends to the combustion chamber section 34a in a sealed manner. At its other end the tubular exhaust gases leading section 34b is coupled to the exhaust gases outlet opening 32b2 of the lid member 32b. In particular, the exhaust gases piping 34 is a one-piece unitary member having the combustion chamber section 324a and the exhaust gases leading section 34b. However, also other configurations are possible. As is illustrated in the figures, the exhaust gases leading section 34b is provided in several loops within the main body 32a of the liquid tank 32. This is to increase the contact surface between the exhaust gases piping 34 and a heating liquid provided within the liquid tank 32. By doing so a heat transfer from the exhaust gases within the exhaust gases piping 34 to the heating liquid within the liquid tank 32 is increased. The exhaust gases outlet opening 32b2 of the lid member 32 is configured such that, in the assembled state of the heating apparats 1, it is positioned on the first inlet opening 16b2A of the exhaust gases flow duct 16b2. Thus, the exhaust gases can flow from the exhaust gases piping 34 into the exhaust gases flow duct 16b2 of the coupling member 16. The contact between the exhaust gases piping 34 and the exhaust gases flow duct 16b2 is sealed with an O-ring, for example in form of a silicon O-ring. The O-ring is highly heat resistant to seal the connection between the exhaust gases piping 34 and the exhaust gases flow duct 16b2 reliably.

The cold heating liquid piping 36 goes through the cold heating liquid inlet opening 32b3 of the lid member 32b into the liquid tank 32. Thus, the heating liquid to be heated can be supplied to the inner of the liquid tank 32. The hot heating liquid piping 38 goes through the hot heating liquid outlet opening 32b4 of the lid member 32b out of the liquid tank 32. Thus, the hot heating liquid can be discharged from the inner of the liquid tank 32. In the assembled state, and the finally set configuration of the heating apparatus 1, the hot heating liquid outlet opening 32b4 and the hot heating liquid piping 36 have to be positioned at an upper position as compared to the cold heating liquid inlet opening 32b3 and the cold heating liquid piping 36 to achieve an expedient overall configuration.

In the illustrated embodiment, two electrically driven heating members 39 are inserted through the two equipment insertion openings 32b and 32b6 into the liquid tank 32. The heating members 39 are coupled to the PCBA 18 to be controlled and/or operated by the PCBA 18. The heating members 39 provide a further possibility to heat up the heating liquid within the liquid tank 32 either instead of or together with exhaust gases from the first burner 20. Thus, an increased heating rate is achieved. Moreover, if desired, it is possible to heat the heating liquid within the liquid tank 32 by electrical power only. Other equipment components like temperature sensors or the like can be inserted through one of the equipment insertions openings 32b5 and 32b6 and/or at least one of the equipment insertion openings 32b5 and 32b6 can be closed by a removable lid member or may be sealed permanently.

The second heat exchanging unit 40 is configured to enable heat exchange between exhaust gases from the second burner 22 and ventilation air. For this, the second heat exchanging unit 40 comprises a ventilation air enclosure 42 and an exhaust gases piping 44.

The ventilation air enclosure 42 comprises a tubular body section 42a and a lid section 42b. The tubular body section 42a is sealed at one side thereof with an end plate 42a1. The end plate 42a1 is provided with a ventilation air inlet opening 42a1A and an exhaust gases inlet opening 42a1B. The end plate 42a1 is configured such that it can be coupled to the secondary housing 14 and/or the coupling member 16 in such a manner that, in the assembled state of the heating apparatus 1, the ventilation air inlet opening 42a1A of the ventilation air enclosure 42 is positioned on the ventilation air outlet opening 14b of the secondary housing 14. Thus, the combustion area 22e of the second burner 22 protrudes through the exhaust gases inlet opening 42a1B into the ventilation air enclosure 42. Furthermore, the end plate 42a1 further comprises an exhaust gases outlet opening 42a1C. The exhaust gases outlet opening 42a1C is configured to be coupled via a silicone O-ring (not illustrated) to the second inlet opening 16b2B of the exhaust gases flow duct 16b2 of the coupling member 16. Said O-ring is highly heat resistant.

The lid section 42b is coupled at the other side of the body portion 42a to confine the inner space of the ventilation air enclosure 42. The lid section 42b is provided as separate element. The lid section 42b comprises four ventilation air outlet openings 42b1 to 42b4 arranged in pairs on two opposing side surfaces of the lid section 42b. Of course, also other configurations for the ventilation air outlet openings 42b1 to 42b4, like configurations with less or even more ventilation outlet openings and/or configurations having further elements like pipes or safety meshes, can be realized.

The exhaust gases piping 44 is provided to one end thereof with a combustion chamber section 44a. The combustion chamber section 44a is coupled to the end plate 42a1 of the ventilation air enclosure 42 in such a manner that, in the assembled state of the heating apparatus 1, the combustion air flow duct 22a of the second burner 22 is coupled to the combustion chamber section 44a of the exhaust gases piping 44 in a sealed manner. For this, a common O-ring can be provided between the second burner 22 and the exhaust gases piping 44. Moreover, in the assembled state of the heating apparatus 1, the combustion area 22e of the second burner 22 is located within the combustion chamber section 44a of the exhaust gases piping 44. Thus, the combustion reaction of the second burner 22 can take place in the combustion chamber section 44a of the exhaust gases piping 44.

The exhaust gases piping 44 further has a tubular exhaust gases leading section 44b. One end of the tubular exhaust gases leading section 44b is coupled to the combustion chamber section 44a in a sealed manner. The other end of the tubular exhaust gases leading section 44b is coupled to the exhaust gases outlet opening 42a1C of the ventilation air enclosure 42. In particular, the exhaust gases piping 44 is a one-piece unitary member having the combustion chamber section 44a and the exhaust gases leading section 44b. However, also other configurations are possible. As is illustrated in FIGS. 8A and 8B, the exhaust gases leading section 44b is provided in several loops within the body portion 42a of the ventilation air enclosure 42. By providing the several loops the contact area between the exhaust gases piping 44 and a ventilation air within the ventilation air enclosure 42 is increased. This enables an increase of the heat transfer from the exhaust gases within the exhaust gases piping 44 to the ventilation air. The exhaust gases outlet opening 42a1C of the main body 42a is configured such that, in the assembled state of the heating apparatus 1, it is positioned on the second inlet opening 16b2B of the exhaust gases flow duct 16b2. Thus, exhaust gases can flow from the exhaust gases piping 44 into the exhaust gases flow duct 16b2 of the coupling member 16. The contact between the exhaust gases piping 44 and the exhaust gases flow duct 16b2 is sealed with a heat resistant silicon O-ring. Thus, this connection is sealed in a reliable manner.

Figure 7:
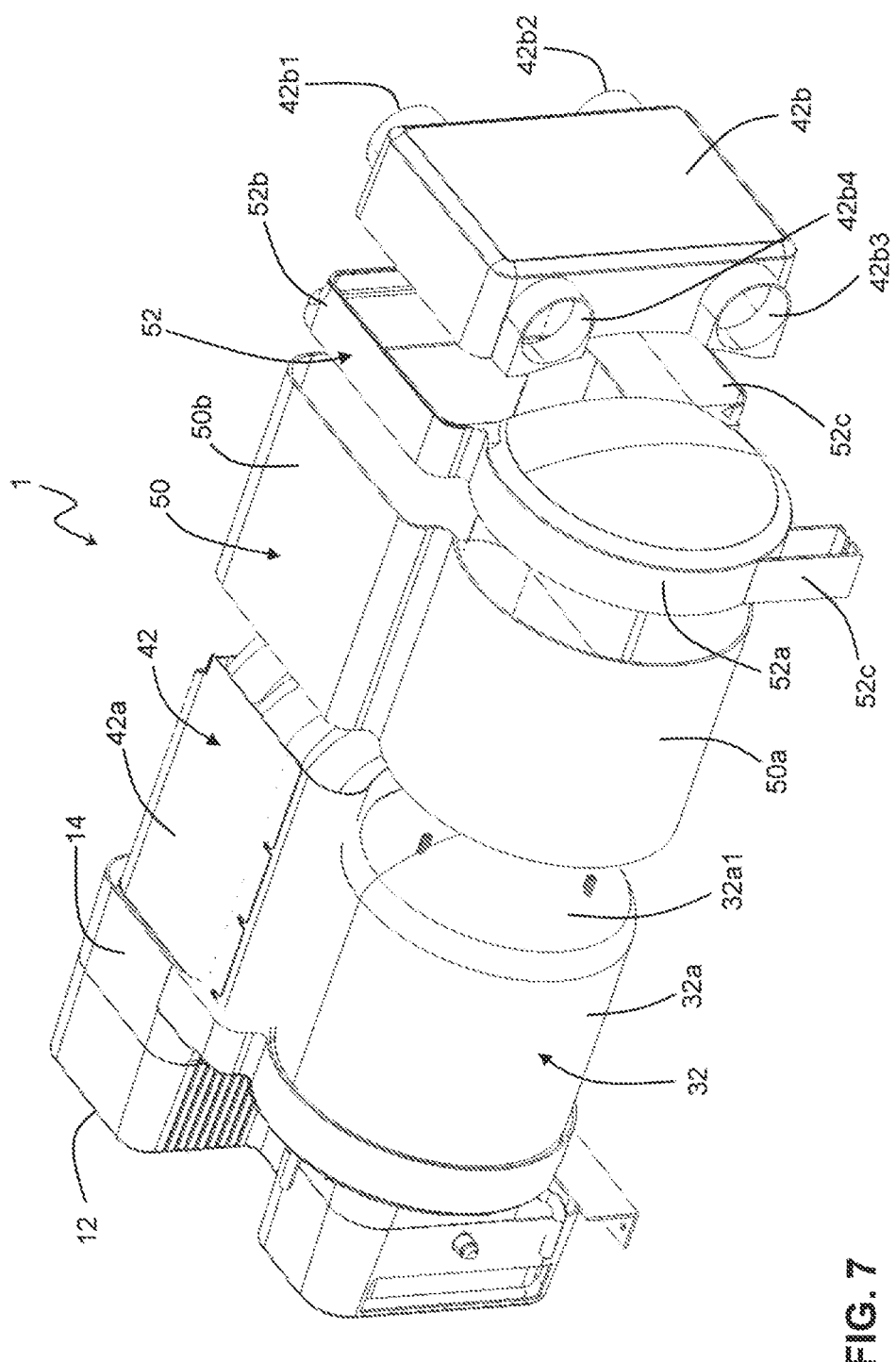
FIG. 7 is another partially exploded illustration of the heating apparatus of FIGS. 1 to 3.

As for example can be seen in FIG. 7, the heating apparatus 1 further comprises a heat exchanging units housing shell 50 and a supplementary mounting member 52.

The heat exchanging units housing shell 50 is a tubular member configured to be pushed onto the two heat exchanging units 30 and 40 and to be fixed to the heating unit 10. The heat exchanging units housing shell 50 comprises a first heat exchanging unit section 50a and a second heat exchanging unit section 50b corresponding a respective one of the two heat exchanging units 30 and 40 in cross sectional shape as seen along their longitudinal axes. With the heat exchanging housing shell 50, the overall configuration of the heating apparatus 1 gains structural stability and protection against external influences.

The supplementary mounting member 52 serves as lid member for the heat exchanging units housing shell 50. The supplementary mounting member 52 is coupled to the heat exchanging units housing shell 50 on the side opposing the side to which the heating unit 10 is coupled. The supplementary mounting member 52 is coupled to the heat exchanging units housing shell 50 in an appropriate manner like, for example, via form-fitting or separate coupling means. The supplementary mounting member 52 comprises a first heat exchanging unit section 52a, a second heat exchanging unit section 52b and at least one mounting section 52c being coupled to each other.

The first heat exchanging unit section 52a of the supplementary mounting member 52 is configured to seal the first heat exchanging unit section 50a of the heat exchanging units housing shell 50.

The second heat exchanging unit section 52b of the supplementary mounting member 52 consists of a frame defining a central opening. The central opening of the lid section 42b of the second heat exchanging unit 40 can be coupled to the body portion 42a of the second heat exchanging unit 40 in the longitudinal direction thereof.

In particular, the heating unit 10, the first heat exchanging unit 30 and the second heat exchanging unit 40 are provided as independent self-contained components coupled to each other in a releasable manner to form the heating apparatus 1. The heat exchanging units housing shell 50 is configured to enclose the two heat exchanging units 30 and 40 at least partly. Thus, the two heat exchanging units 30 and 40 cannot be separated from each other without removing the heat exchanging units housing shell 50. The heat exchanging units housing shell 50 is configured to be coupled to the heating unit 10 in a releasable manner. The heat exchanging units housing shell 50 is configured to couple the heating unit 10 and the two heat exchanging units 30 and 40 to each other in such a manner that for removal of the heat exchanging units housing shell 50 and, thus, for disassembling of the heating apparatus 1, the heat exchanging units housing shell 50 has to be decoupled from the heating unit 10 first.

As illustrated in FIG. 7, the supplementary mounting member 52 comprises two mounting sections 52c. One mounting section 52c is coupled to the first heat exchanging unit section 52a and the other mounting section 52c is coupled to the second heat exchanging unit section 52b of the supplementary mounting member 52. Each of the mounting sections 52c is provided with a bearing surface having at least one through hole. At least one through hole 52c2 allows appropriate bolts or screws to pass therethrough. Thus, the supplementary mounting member 52 can be fixed to a desired and suitable surface of a recreational vehicle like, for example, to a wall, floor or ceiling of the recreational vehicle.

It is to be noted that the above described configuration is a preferred but merely exemplary embodiment of a heating apparatus 1 for a heating arrangement 100 according to the present invention. In particular, many of the above described structural features can be replaced by others or adapted if desired or necessary. Such modifications lie in the abilities and freedom of a skilled artisan without leaving the scope of the present invention.

Figure 9:
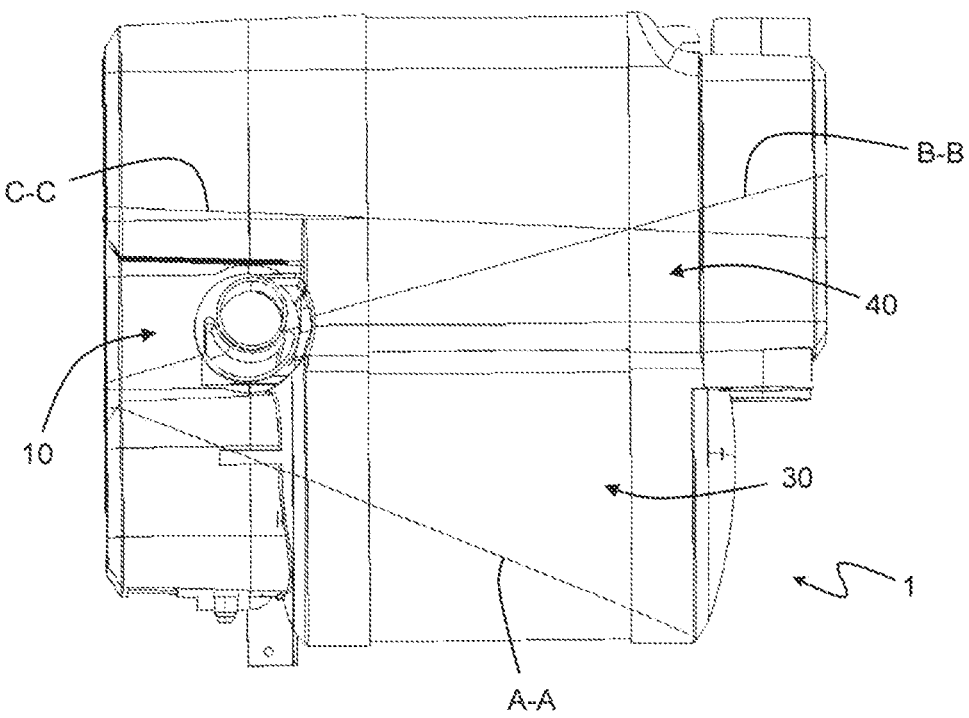
FIG. 9 is a spatial view of the heating apparatus illustrated in the above referenced FIGS. Supplemented with lines indicating various cross-sectional planes.
Figure 10A:
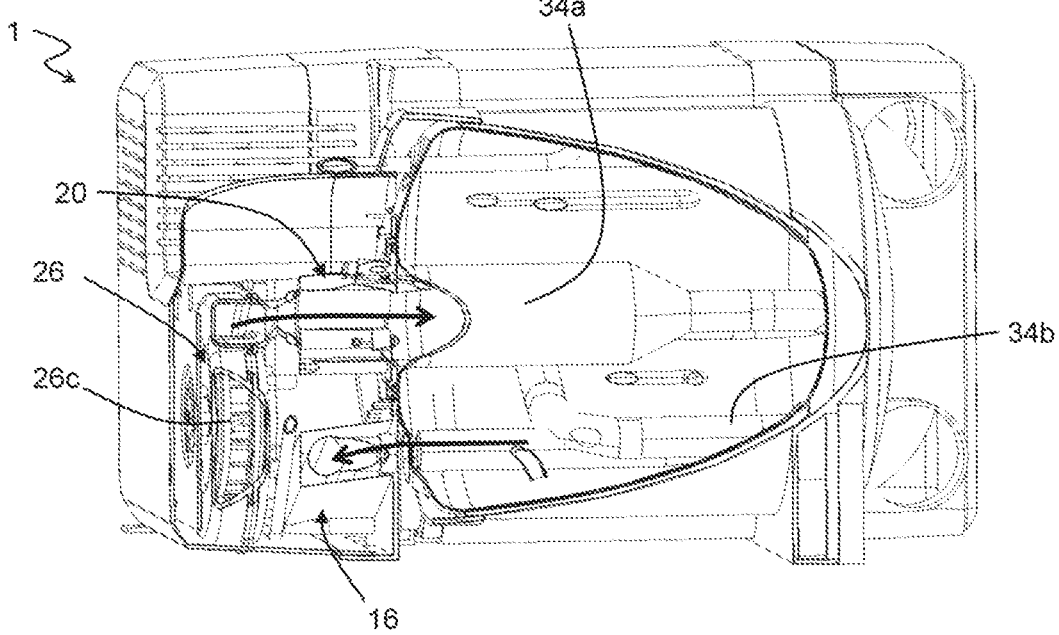
FIG. 10A is a cross-sectional view of said heating apparatus along line A-A of FIG. 9.
Figure 10B:
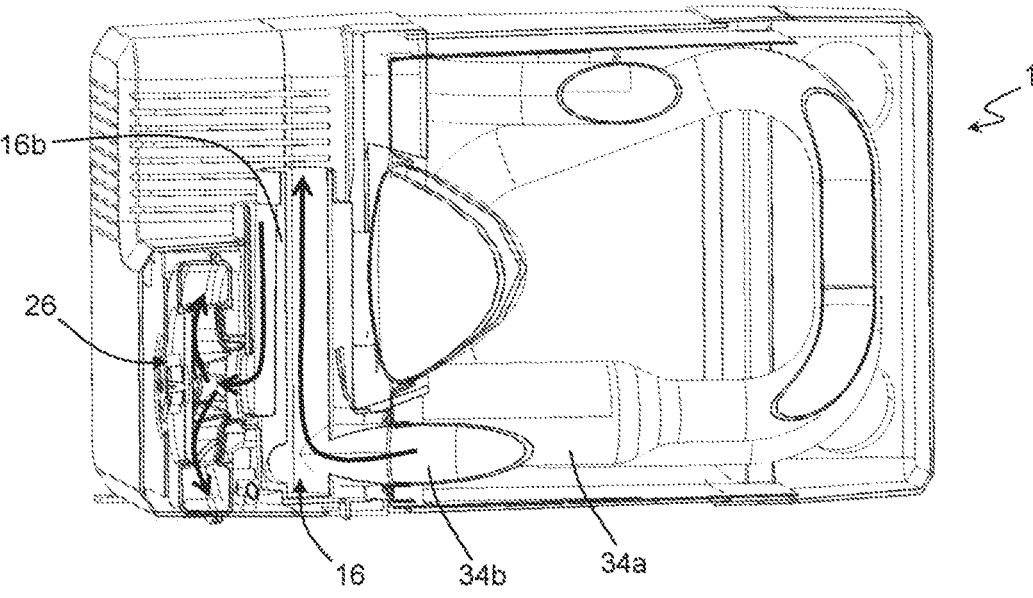
FIG. 10B is a cross-sectional view of said heating apparatus along line B-B of FIG. 9.
Figure 10C:
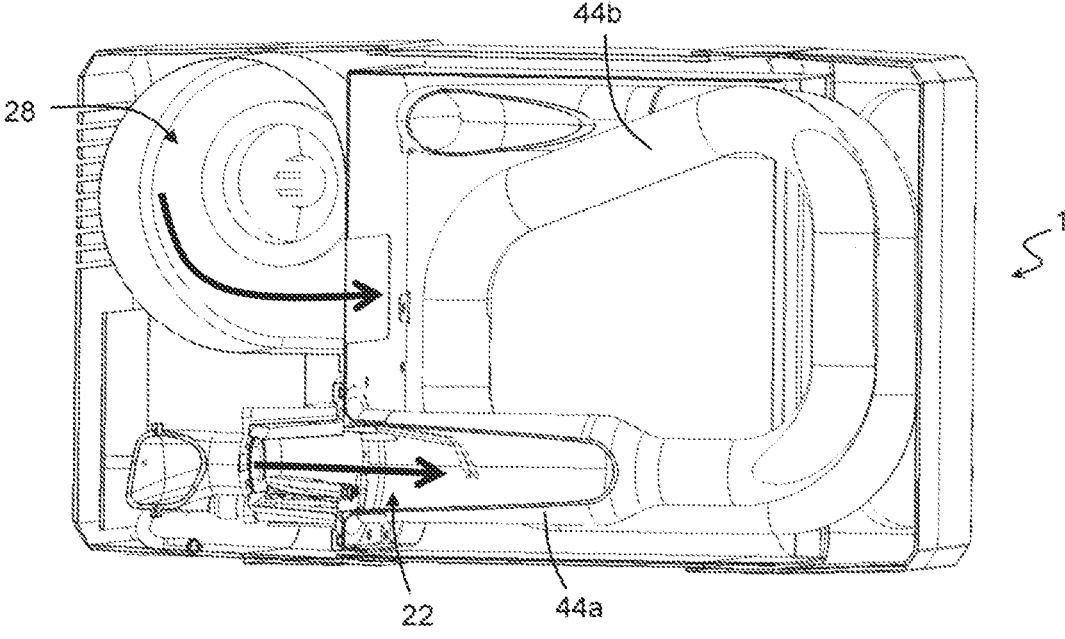
FIG. 10C is a cross-sectional view of said heating apparatus along line C-C of FIG. 9.

To facilitate the understanding of the specific configuration of this exemplary embodiment (in particular with regard to the various flow paths) FIGS. 10A to 10C illustrate several cross sections of the heating apparatus 1 according to the present invention, while in FIG. 9 the various cross-sectional planes are depicted.

Figure 11:
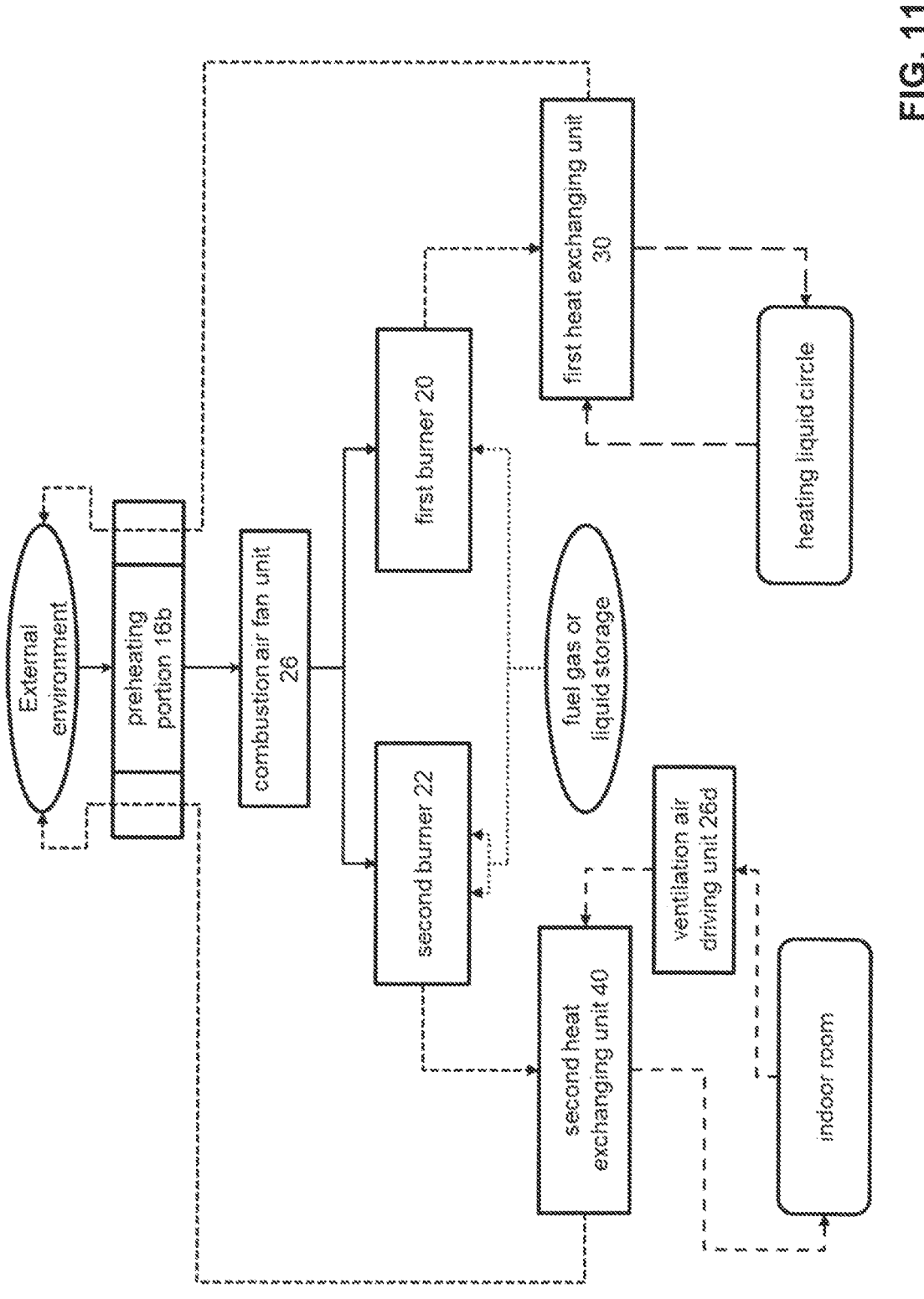
FIG. 11 is a schematic illustration of the overall structural configuration of the heating apparatus illustrated in the above referenced FIGS.

In the following and in particular referring to FIG. 11, a method for heating fluids with the above described heating apparatus 1 according to the present invention is described.

The combustion air fan unit 26 is operated to suck combustion air from an external environment of the heating apparatus 1. The combustion air is forced through the combustion air flow duct 16b1 of the preheating portion 16b of the coupling member 16 towards each of the two provided burners 20 and 22, thus, generating an overpressure within the respective combustion areas.

Each of the two burners 20 and 22 is further supplied with fuel gas or liquid from a fuel gas storage or liquid storage coupled to the two burners 20 and 22. Due to the fact that the second burner 22 is provided with two nozzles 22b1 and 22b2 to supply the fuel gas or liquid to the combustion area 22e, the rate with which fuel gas or liquid is supplied to the combustion area 22e can be switched between four various operation states by operating the respective valves, as described above in detail. Accordingly, it is not necessary to provide an expensive and error-prone burner with a complex structure to achieve various operation sates. The combustion air and the fuel gas or liquid are mixed with each other within the combustion areas. The mixtures obtained in the combustion areas are ignited by the respective ignition arrangements 20c and 22c to burn within the respective combustion areas.

Hot exhaust gases from the first burner 20 are guided through the exhaust gases piping 34 of the first heat exchanging unit 30 and transfer some of their heat to a heating liquid provided within the liquid tank 32 of the first heat exchanging unit 30. Permanently, fresh cold heating liquid from a heating liquid circuit is supplied to the liquid tank through the cold heating liquid inlet opening 32*b*3, while hot or at least heated heating liquid is discharged through the hot heating liquid opening 32*b*4 back into the heating liquid circuit. Thus, cold heating liquid is supplied to the heating apparatus 1 and hot/heated heating liquid is discharged from the heating apparatus 1

Hot exhaust gases from the second burner 22 are guided through the exhaust gases piping 44 of the second heat exchanging unit 40 and transfer some of their heat to the ventilation air. The ventilation air is forced by the ventilation air driving unit 26*b* to move from an indoor room of the recreational vehicle, respectively a space in which the air is to be heated, through the body portion 42*a* of the second heat exchanging unit 40 back to the indoor room. Thus, cold ventilation air from the indoor room or interior of the recreational vehicle is sucked into the heating apparatus 1 and heated ventilation air is discharged into the indoor room or interior from the heating apparatus 1.

The exhaust gases leaving both of the heat exchanging units 30 and 40, while the exhaust gases do still have high temperatures, are guided into the exhaust gases flow duct 16*b*2 of the preheating portion 16*b* and, thus, preheat the combustion air which is sucked through the combustion air flow duct 16*b*1. This preheating results in a very efficient heating operation. Afterwards, the exhaust gases are discharged into the external environment.

Although, in the above described process, both of the ventilation air and the heating liquid are heated simultaneously, the heating apparatus 1 can be used as well for heating only one of the two fluids. As a skilled artisan will be able to consider various possibilities to operate the above described heating apparatus 1 resulting from its specific structural configuration, no detailed listing of all possible modes of operation is given here for the sake of brevity.

In the following, some exemplary modifications are described that improve the characteristics and/or functionality of the heating apparatus 1 according to the present invention.

According to a first modification, the heating apparatus 1 can be provided with a secondary air supply arrangement. By this secondary air supply arrangement, a supply of secondary air from the external environment to at least one of the burners can be realized. In such a configuration, the combustion air depicts the primary air. While the primary air is supplied to start a combustion reaction with the fuel gas or liquid, the secondary air is provided to complete the reaction. This results in an improved flame stability and emission characteristics. A burner with such a functionality is also called flat surface burner. A flat surface burner can be further provided with a wall, the wall having a plurality of apertures and being arranged to further separate the flow of primary air or combustion air from the flow of secondary air. In such a configuration, the dimension of the apertures is optimized as a function of the rate of secondary air, which in particular also depends on the provided fans.

Although, referring to the above embodiment a configuration with two burners is described, also implementations having more than two burners can be provided if desired. Preferably, even if more than two burners are provided, all of the burners can be supplied with combustion air by the one single combustion air fan, to transfer the therewith obtained simple and reliable setting to such a configuration.

Although within the scope of the above embodiment a configuration with only two nozzles 22*b*1 and 22*b*2 in the second burner 22 is described, the second burner 22 (and also the first burner 20) can be provided with more than two nozzles in order to implement more than four distinct operation states.

Although within the scope of the above embodiment a configuration in which both nozzles 22*b*1 and 22*b*2 of the second burner 22 have different structures (cross sections of their supply openings) are described, the nozzles 22*b*1 and 22*b*2 can have the same structure as well. Effectively, only three various operation states are, thus, realized.

According to one embodiment of a monostable valve, as used herein, includes a valve body having an inlet for connection to a fuel supply and an outlet for connection to the respective nozzle. A valve seat is positioned between the inlet and the outlet of the gas body. A valve member is linearly movable between a closed position or state and an open position or state. In the closed position or state the valve member is seated on the valve seat. In the open position or state the valve member is spaced from the valve seat. Usually, a spring acting on the valve member keeps the valve member in the closed position. A solenoid (electromagnet) is fixed to the valve body and, when energized, acts on the valve member to move it to or keep it in the open position, i.e. when a gas injection is required. Conversely, when the solenoid is not energized the spring moves the valve member to or keeps the valve member in the closed position, i.e. when a gas injection is not required. Thus, the closure device moves linearly with respect to the electromagnet, which is axially fixed. The solenoid is controlled and driven directly by the PCBA. No movable elements are provided for actuating the gas valve. The solenoid may be excited with two different current values: a constant first value and a constant second value, lower than the first one. Thus, when the gas valve is actuated for opening, the solenoid is firstly excited with the first value until a predetermined time, for example 100 ms, has passed, then it is excited with the second value. The transition from the first value to the second value is controlled and actuated by the PCBA depending on the time only, i.e. independently on the position of the valve itself. However, since the valve could not open instantaneously, for example in less than 100 ms, it is likely that the valve reaches the open position when the coil is excited with the second (lower) value. Then the valve is hold in the opening position as long as the coil is kept excited with the second value.

The liquid tank may be further coupled to a frost valve. The frost valve comprises a pressure valve and is configured to perform at least the following basic functions: manual drain, frost draining (automatic) and pressure relief. However, also other configurations are possible.

The heating apparatus 1 further comprises an external container. The components of the heating apparatus 1 are arranged in the external container. The external container shields the various components of the heating apparatus against harmful external influences like, for example, sun radiation, water or dirt. Further, the external container is made of molded plastic, as such a material is highly resistive to external influences and forces.

According to a further modification, the heating apparatus further includes a supplementary electric heater. The electric heater provides a heating coil to achieve a supplementary heating of the ventilation air. The electric heater can be positioned inside the external container, next to the second heat exchanger and is driven and controlled by the PCBA. Thus, it is possible to increase the heating power of the heating apparatus 1.

The heating apparatus 1 may be provided with a master valve for cutting the supply with fuel gas or liquid centrally.

Figure 12:
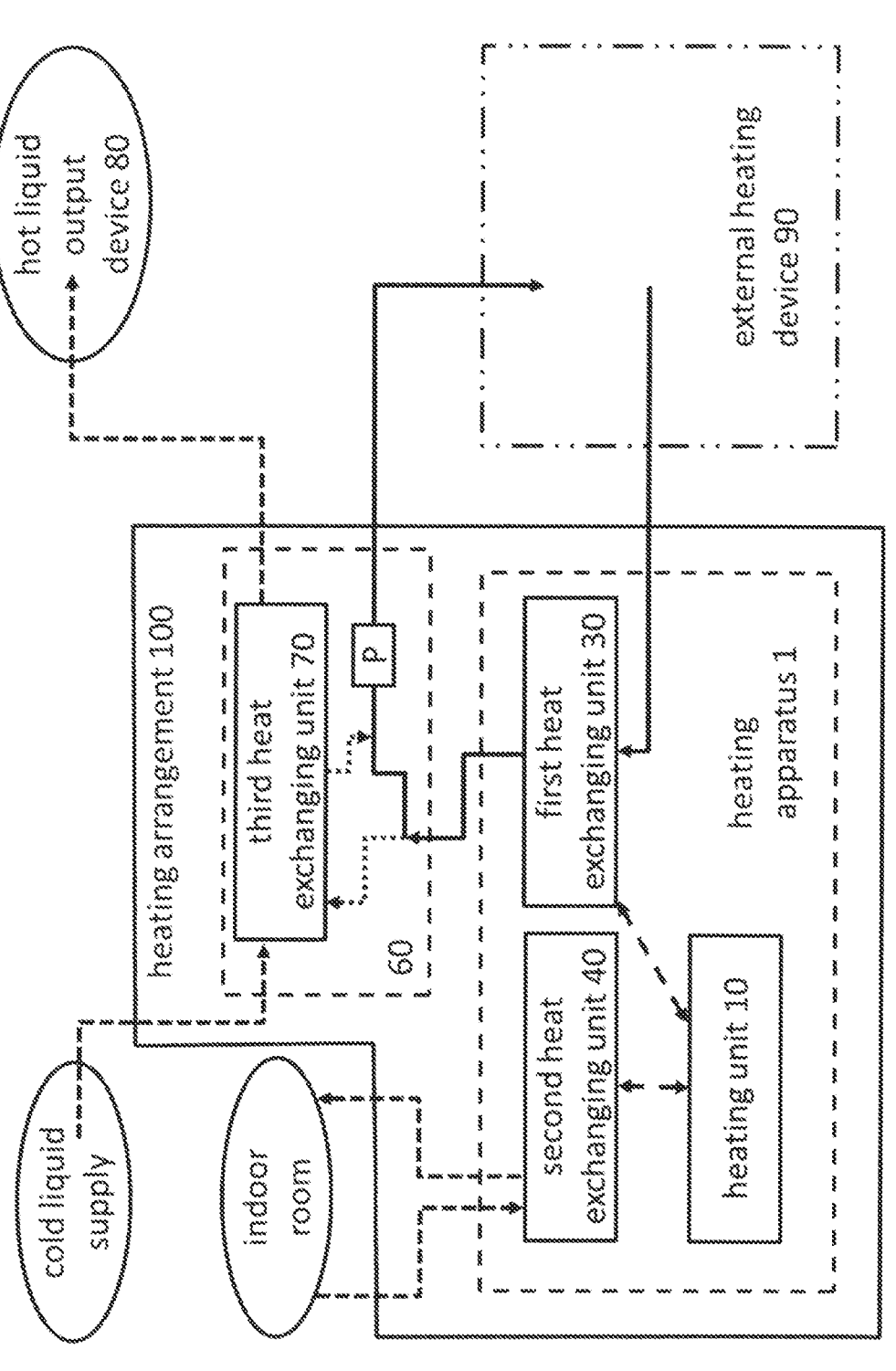
FIG. 12 is a schematic illustration of the structural configuration of a heating arrangement according to an exemplary embodiment.

Now, the structural configuration and function of a heating arrangement 100 according to an exemplary embodiment of the present invention will be described with reference to FIG. 12 in a situation, in which it is coupled to the relevant exterior components.

The heating arrangement 100 is formed of the above described heating apparatus 1 and a heat distribution unit 60. However, next to the present embodiment also other heating apparatuses 1 and/or further components can be provided in the heating arrangement 100, if desired.

As already set forth above, the heating apparatus 1 comprises a heating unit 10, a first heat exchanging unit 30 and a second heat exchanging unit 40. The heating unit 10 is configured to generate hot air. In the above example, the hot air corresponds to the hot exhaust gases or at least is part thereof. The two heat exchanging units are coupled to the heating unit 10 to receive hot air/exhaust gasses therefrom more or less independently of each other. For example, the two heat exchanging units are coupled to the heating unit 10 in parallel to each other.

The first heat exchanging unit 30 is configured to transfer heat from the hot air/hot exhaust gasses from the heating unit 10 to heating liquid within a heating liquid circle. The heating liquid circle guides the hot heating liquid form the first heat exchanging unit 30 to the heat distribution unit 60. The heat distribution unit 60 comprises a hot heating liquid main flow path leading from a hot heating liquid input connection of the heat distribution unit 60 directly to a hot heating liquid output connection of the heat distribution unit 60. Furthermore, the heat distribution unit 60 comprises a hot heating liquid side flow path branching off from the hot heating liquid main flow path and leading to a third heat exchanging unit 70.

The third heat exchanging unit 70 comprises a cold liquid input connection. The cold liquid input connection is configured to be coupled to a cold liquid supply. The third heat exchanging unit 70 further comprises a hot liquid output connection. The hot liquid output connection is configured to be coupled to a hot liquid output device 80. In other words, the third heat exchanging unit 70 can be coupled to an external liquid supply line leading from the cold liquid supply to the hot liquid output device 80.

The third heat exchanging unit 70 is a high efficiency liquid to liquid heat exchanger. The third heat exchanging unit 70 is configured to transfer heat from the heating liquid within the heating liquid side flow path to the liquid within the liquid supply line. Thus, the cold liquid input into the third heat exchanging unit 70 is transformed into hot liquid supplied to the hot liquid output device 80. The external liquid supply line can be a standard water supply line of a recreational vehicle provided to supply water for sanitary and/or cooking purposes and the hot liquid output device 80 can be a common faucet.

The heating liquid circle leads the still hot heating liquid from the heat distribution unit 60 towards an external heating device 90. The external heating device 90 is configured to transfer heat from the still hot heating liquid to other components and or areas. For example, the external heating device can be a floor heating of a recreational vehicle.

Finally, the more or less cold heating liquid is guided back into the first heat exchanging unit 30 to be heated again. For this, the cold heating liquid can be guided through a cold heating liquid flow path within the heat distribution unit 60 or directly towards the first heat exchanging unit 30.

To be able to control the amount of hot heating liquid branched off from the hot heating liquid main flow path into the hot heating liquid side flow path towards the third heat exchanging unit 70, the heat distribution unit 60 comprises a corresponding valve unit. Furthermore, in the illustrate embodiment the heat distribution unit is provided with a heating fluid pump P. The heating fluid pump P is configured to influence and control the flow of the heating liquid through the heating arrangement 100 and, thus, through the heating liquid circle.

It is to be noted that, in principle, the heating liquid can be replaced by any appropriate fluid. However, it is believed that the usage of a heating liquid is to be preferred for various technical reasons.

The second heat exchanging unit 40 is configured, as described above in detail, such that it is configured for heat exchange between the hot air/combustion gases from the heating unit 10 and ventilation air, for example from an indoor room of a recreational vehicle.

The above described configurations are merely preferred examples for implementations of respective components. They are not provided to limit the scope of protection defined by the appended set of claims but for illustrative purposes merely. A skilled artisan will be able to imagine various modifications of the above described configurations without contravening the basic idea of the present invention and/or leaving the scope of protection as defined by the appended set of claims.

Finally, it is pointed to the fact that the present embodiments refer not just to a specific heating arrangement 100 comprising a corresponding heating apparatus 1 and a heat distribution unit 60, but also to the heat distribution unit 60 per se.

REFERENCE NUMERALS

1 heating apparatus
10 heating unit
12 primary housing
12a opening
12c ventilation slots
14 secondary housing
14b ventilation air outlet section
14c ventilation slots
16 coupling member
16a base portion
16a1 bearing surface
16a2 through holes
16b preheating portion
16b1 combustion air flow duct
16b1A inlet opening
16b1B outlet opening
16b2 exhaust gases flow duct
16b2A first inlet opening
16b2B second inlet opening
16b2C outlet opening
16b3 separation wall
16c printed circuit board assembly (PCBA) coupling portion
16c1 threaded bore
16d first burner coupling portion
16e second burner coupling portion
18 printed circuit board assembly (PCBA)
20 first burner
20b nozzle
20c ignition arrangement
22 second burner
22a combustion air flow duct
22a1 inlet opening 22*b*1 first nozzle
22*b*2 second nozzle
22*c* ignition arrangement
22*d* controlling arrangement of the second burner
22*e* combustion area
24 fuel gas or liquid piping
26 combustion air fan unit
26*a* first housing element
26*a*1 combustion air inlet opening
26*a*2 first combustion air outlet opening
26*a*3 second combustion air outlet opening
26*b* second housing element
26*b*1 driving rod through hole
26*c* combustion air fan
26*d* combustion air fan driving unit
26*e* combustion air fan chamber
28 ventilation air driving unit
28*a* inlet opening
28*b* outlet opening
30 first heat exchanging unit
32 liquid tank
32*a* main body
32*a*1 bottom plate
32*b* lid member
32*b*1 exhaust gases inlet opening
32*b*2 exhaust gases outlet opening
32*b*3 cold liquid inlet opening
32*b*4 hot liquid outlet opening
32*b*5 first equipment insertion opening
32*b*6 second equipment insertion opening
34 exhaust gases piping
34*a* combustion chamber section
34*b* exhaust gases leading section
36 cold liquid piping
38 hot liquid piping
39 heating members
40 second heat exchanging unit
42 ventilation air enclosure
42*a* body portion
42*a*1 end plate
42*a*1A ventilation air inlet opening
42*a*1B exhaust gases inlet opening
42*a*1C exhaust gases outlet opening
42*b* lid section
42*b*1 first ventilation air outlet opening
42*b*2 second ventilation air outlet opening
42*b*3 third ventilation air outlet opening
42*b*4 fourth ventilation air outlet opening
44 exhaust gases piping
44*a* combustion chamber section
44*b* exhaust gases leading section
50 heat exchanging units housing shell
50*a* first heat exchanging unit section
50*b* second heat exchanging unit section
52 supplementary mounting member
52*a* first heat exchanging unit section
52*b* second heat exchanging unit section
52*c* mounting section
60 heat distribution unit
70 third heat exchanging unit
80 hot liquid output device
90 external heating device
100 heating arrangement
P heating liquid pump

The invention claimed is:

1. A heating arrangement for recreational vehicles, the heating arrangement comprising:

a heating apparatus,
  wherein the heating apparatus comprises a heating unit and a first heat exchanging unit and a second heat exchanging unit, the heating unit having a first burner and a second burner, the first burner configured to generate a first exhaust gas and the second burner configured to generate a second exhaust gas within an exhaust gases piping, the first and the second heat exchanging units are coupled to the heating unit to receive the first exhaust gas and the second exhaust gas from the heating unit independently of each other,
  wherein the first heat exchanging unit is configured for heat exchange between the first exhaust gas of the first burner and a heating liquid, and wherein the second heat exchanging unit is configured for direct heat exchange between the exhaust gases piping having the second exhaust gas from the second burner and ventilation air; and
a heat distribution unit,
  wherein the heat distribution unit comprises a hot heating liquid input connection coupled to the first heat exchanging unit such that the heat distribution unit can receive hot heating liquid from the first heat exchanging unit therethrough and a hot heating liquid output connection configured to be coupled to a hot heating liquid input connection of an external heating device;
  wherein the heat distribution unit comprises a third heat exchanging unit,
  wherein the third heat exchanging unit is configured to be coupled to an external liquid supply line and is further configured for heat exchange between the received hot heating liquid from the first heat exchanging unit and liquid guided through the external liquid supply line.

2. The heating arrangement of claim 1, wherein the heat distribution unit is configured such that the external liquid supply line is a standard water supply line of a recreational vehicle provided to supply water for sanitary and/or cooking purposes.

3. The heating arrangement of claim 1, wherein the heat distribution unit is configured such that the external heating device is a floor heating of a recreational vehicle.

4. The heating arrangement of claim 1, wherein the third heat exchanging unit comprises a cold liquid input connection configured to be coupled to a cold liquid supply of the external liquid supply line and a hot liquid output connection configured to be coupled to a hot liquid output device via the external liquid supply line.

5. The heating arrangement of claim 1, wherein the third heat exchanging unit is configured as a liquid to liquid heat exchanger to increase an overall efficiency of the heating arrangement.

6. The heating arrangement of claim 1, wherein the heat distribution unit comprises a hot heating liquid main flow path leading from the hot heating liquid input connection of the heat distribution unit directly to the hot heating liquid output connection of the heat distribution unit as well as a hot heating liquid side flow path branching off from the hot heating liquid main flow path and leading to the third heat exchanging unit.

7. The heating arrangement of claim 6, wherein the heat distribution unit comprises a valve unit configured to control the amount of hot heating liquid branched off from the hot heating liquid main flow path into the hot heating liquid side flow path towards the third heat exchanging unit.

8. The heating arrangement of claim 1, wherein the heating arrangement comprises a heating liquid pump configured to force a flow of the heating liquid through the heating arrangement, wherein said heating liquid pump is provided as component of the heat distribution unit.

9. The heating arrangement of claim 1, wherein the heating apparatus comprises a cool heating liquid input connection, wherein said cool heating liquid input connection is configured to be connected directly to a cool heating liquid output connection of said external heating device, or wherein the heat distribution unit comprises a cool heating liquid input connection configured to be connected to a cool heating liquid output connection of said external heating device, and said cool heating liquid output connection configured to be coupled to said cool heating liquid input connection of the heating apparatus.

* * * * *